United States Patent [19]

Sato et al.

[11] Patent Number: 5,042,921

[45] Date of Patent: Aug. 27, 1991

[54] LIQUID CRYSTAL DISPLAY APPARATUS

[75] Inventors: Makoto Sato, Fussa; Masahiro Ogawa, Musashimurayama; Tohru Nakakusu, Hoya; Osamu Umeda, Gifu, all of Japan

[73] Assignee: Casio Computer Co., Ltd., Tokyo, Japan

[21] Appl. No.: 426,871

[22] Filed: Oct. 23, 1989

[30] Foreign Application Priority Data

| Oct. 25, 1988 | [JP] | Japan | 63-138766[U] |
| Oct. 25, 1988 | [JP] | Japan | 63-138768[U] |
| Oct. 25, 1988 | [JP] | Japan | 63-138770[U] |
| Oct. 25, 1988 | [JP] | Japan | 63-138771[U] |
| Nov. 8, 1988 | [JP] | Japan | 63-144914[U] |
| Mar. 17, 1989 | [JP] | Japan | 1-29827[U] |
| Jul. 6, 1989 | [JP] | Japan | 1-79140[U] |

[51] Int. Cl.$^5$ .............................................. G02F 1/13
[52] U.S. Cl. .................................... 359/40; 359/63; 359/73; 359/70; 359/49
[58] Field of Search .................. 350/345, 331 R, 338, 350/337, 334; 353/122, 38, 69

[56] References Cited

U.S. PATENT DOCUMENTS

| 4,461,542 | 7/1984 | Gagnon | 350/331 R |
| 4,560,999 | 12/1985 | Tokuhara | 350/345 |
| 4,653,867 | 3/1987 | Urabe et al. | 350/345 |
| 4,715,684 | 12/1987 | Gagnon | 350/331 R |
| 4,722,593 | 2/1988 | Shimazaki | 350/336 |
| 4,726,662 | 2/1988 | Cromack | 350/345 |
| 4,770,525 | 9/1988 | Umeda et al. | 353/122 |
| 4,884,876 | 12/1989 | Lipton et al. | 350/337 |
| 4,913,529 | 4/1990 | Goldenberg et al. | 350/331 R |
| 4,936,658 | 6/1990 | Tanaka et al. | 350/338 |

FOREIGN PATENT DOCUMENTS

| 0121821 | 5/1988 | Japan | 350/337 |
| 63-182987 | 7/1988 | Japan | |

*Primary Examiner*—Rolf Hille
*Assistant Examiner*—Tan Ho
*Attorney, Agent, or Firm*—Frishauf, Holtz, Goodman & Woodward

[57] ABSTRACT

In order to effectively use light from a light source, the light from the light source is split into P-polarized light and S-polarized light by a splitter or the like. The split P-polarized light is directly incident on a liquid crystal display apparatus for displaying an image by using P-polarized light. The split S-polarized light is optically rotated by a wavelength plate or the like and converted into P-polarized light. This P-polarized light is also incident on the liquid crystal display apparatus. The liquid crystal display apparatus effectively utilizes the light from the light source and displays an image with high luminance.

22 Claims, 22 Drawing Sheets

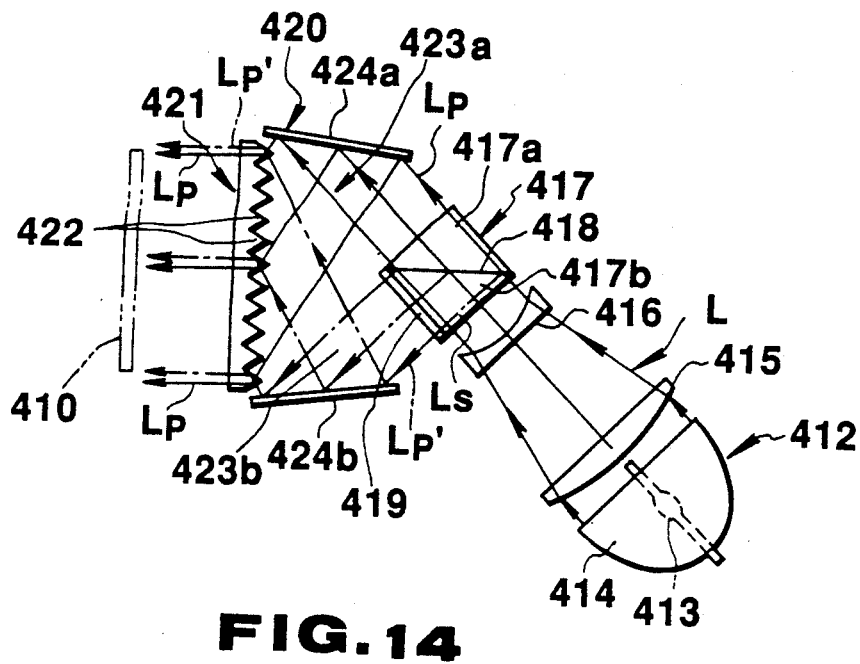
FIG. 14
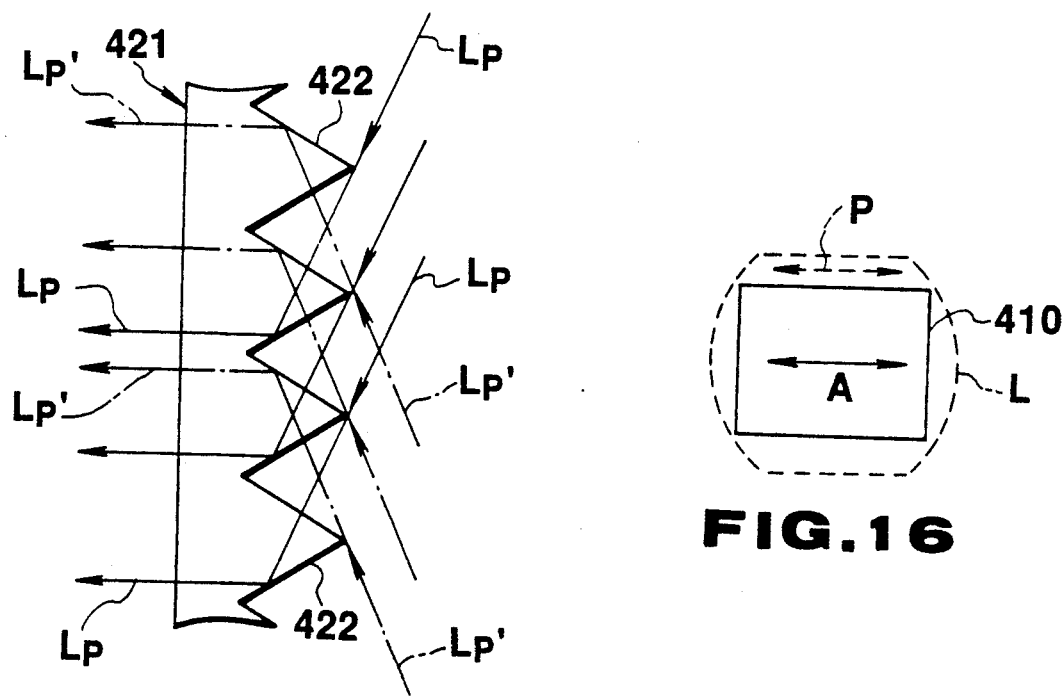
FIG. 15
FIG. 16

LIQUID CRYSTAL DISPLAY APPARATUS

BACKGROUND OF THE INVENTION

1. Field of the Invention

The present invention relates to an improvement in a liquid crystal display apparatus to be used to project an image on a screen or the like in an enlarged scale.

2. Description of the Related Art

Recently, a projector liquid crystal display apparatus, for example, is proposed as a liquid crystal display apparatus for displaying a television image and the like by using a liquid crystal display panel.

FIG. 1 shows a conventional projector liquid crystal display apparatus. Referring to FIG. 1, reference numeral 1 denotes a liquid crystal display panel. A TN (twisted nematic) type liquid crystal device is generally used as the display panel 1. The TN type liquid crystal device comprises a liquid crystal layer in which liquid crystal molecules are twisted; and polarizing plates 2a and 2b located at light incident side and output side, respectively. Reference numeral 3 denotes a light source arranged to oppose a light incident surface of the panel 1. The light source 3 includes a high-luminance light source lamp 4 such as a halogen lamp or xenon lamp; and a reflector 5 for reflecting radiated light from the lamp 4 toward the panel 1. The reflector 5 is a paraboloidal reflector having a parabolic shape for refecting the radiated light from the lamp 4 as parallel light parallel to an optical axis of reflector. Reference numeral 6 denotes a projection lens arranged to oppose a light output surface of the panel 1; and 7, a screen.

In this projector liquid crystal display apparatus, the radiated light from the light source 3 is incident on the panel 1. A display image on the panel 1 is enlarged and projected on the screen 7 by the lens 6. According to this projector liquid crystal display apparatus, a display image on the panel 1 having a small display screen can be viewed in an enlarged scale.

In the above conventional liquid crystal display apparatus, however, radiated light from the light source 3 is directly incident on the panel 1. For this reason, only about half of the radiated light from the light source 3 can be utilized in display on the panel 1. Therefore, since the luminance of a display image on the panel 1 is low, an image projected in an enlarged scale on the screen 7 becomes dark with poor contrast. This is because the panel 1 displays images by using only linearly polarized light transmitted through the incident-side polarizing plate 2a while the radiated light from the light source 3 is natural light including light components having various oscillation directions. More specifically, of the light from the light source 3, light having an oscillation direction which is the same as a direction of a transmission axis of the polarizing plate 2a is incident on the panel 1 through the polarizing plate 2a. However, light having a component in an oscillation direction perpendicular to the transmission axis of the polarizing plate 2a is absorbed by the polarizing plate 2a. Therefore, an amount of light actually incident on the panel 1 is reduced to about half that of the light from the light source 3.

SUMMARY OF THE INVENTION

The present invention has been made in consideration of the above situation and has as its object to provide a liquid crystal display apparatus which can utilize light from a light source in display on a liquid crystal display panel with almost no waste light and can display an image with high luminance on the liquid crystal display panel, thereby obtaining a display image with high luminance and high contrast.

According to the present invention, there is provided a liquid crystal display apparatus comprising, light source for emitting light, splitting unit for splitting the light emitted from the light source into two linearly polarized light beams whose polarization axes are perpendicular to each other, optical rotatory unit for optically rotating the one of the light beams split by the splitting unit, and liquid crystal display means for receiving one of the linearly polarized light beams optically rotated by the optical rotatory means and the other linearly polarized light beam and displaying an image.

According to the liquid crystal display apparatus of the present invention, theoretically, all of light transmitted through a polarizing beam splitter can be utilized in display on the liquid crystal display panel. Therefore, light from the light source can be utilized in display on the liquid crystal display panel with almost no waste light, and an image with high luminance can be displayed on the liquid crystal display panel, thereby obtaining a bright image with high contrast as an image to be projected in an enlarged scale on a screen.

BRIEF DESCRIPTION OF THE DRAWINGS

FIGS. 2 and 3 are views showing a first embodiment of the present invention, in which FIG. 2 is a schematic view of a projector liquid crystal display apparatus and FIG. 3 is a view showing in detail a main part in FIG. 2;

FIGS. 5 and 6 are views of a third embodiment of the present invention, in which FIG. 5 is a side view of a liquid crystal display apparatus and FIG. 6 is an enlarged view of a light source;

FIG. 14 is a side view of a liquid crystal display apparatus according to a ninth embodiment of the present invention;

FIG. 15 is an enlarged view of a part of a prism for synthesizing light in the ninth embodiment;

FIG. 16 is a view showing a polarization direction of linearly polarized light incident on a liquid crystal display panel and a transmission optical axis of an incident-side polarizing plate of the liquid crystal display panel in the ninth embodiment;

DETAILED DESCRIPTION OF THE PREFERRED EMBODIMENTS

The first embodiment of the present invention will be described with reference to the accompanying drawings.

Figure 1:
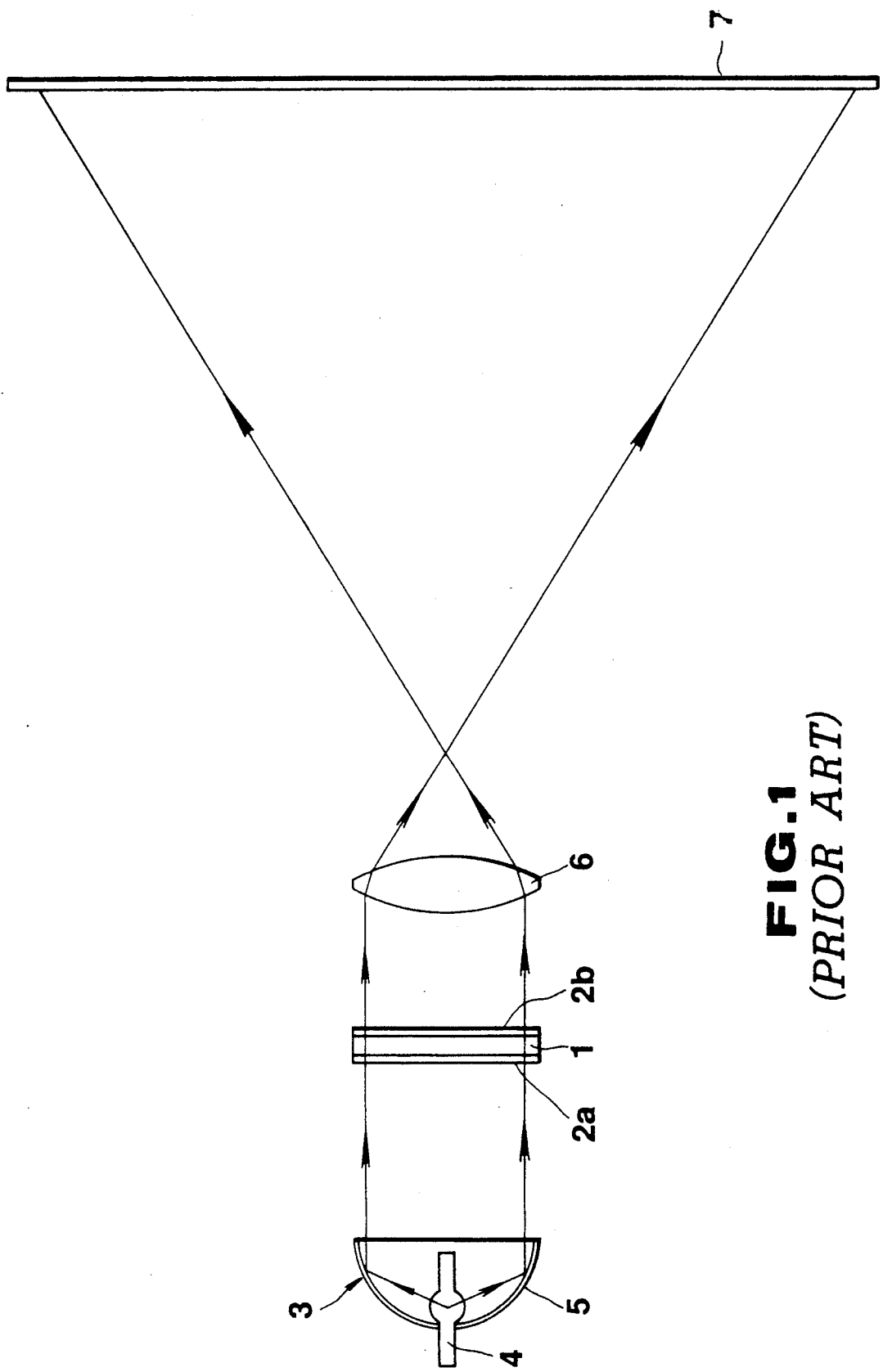
FIG. 1 is a schematic view of a conventional projector liquid crystal display apparatus.
Figure 2:
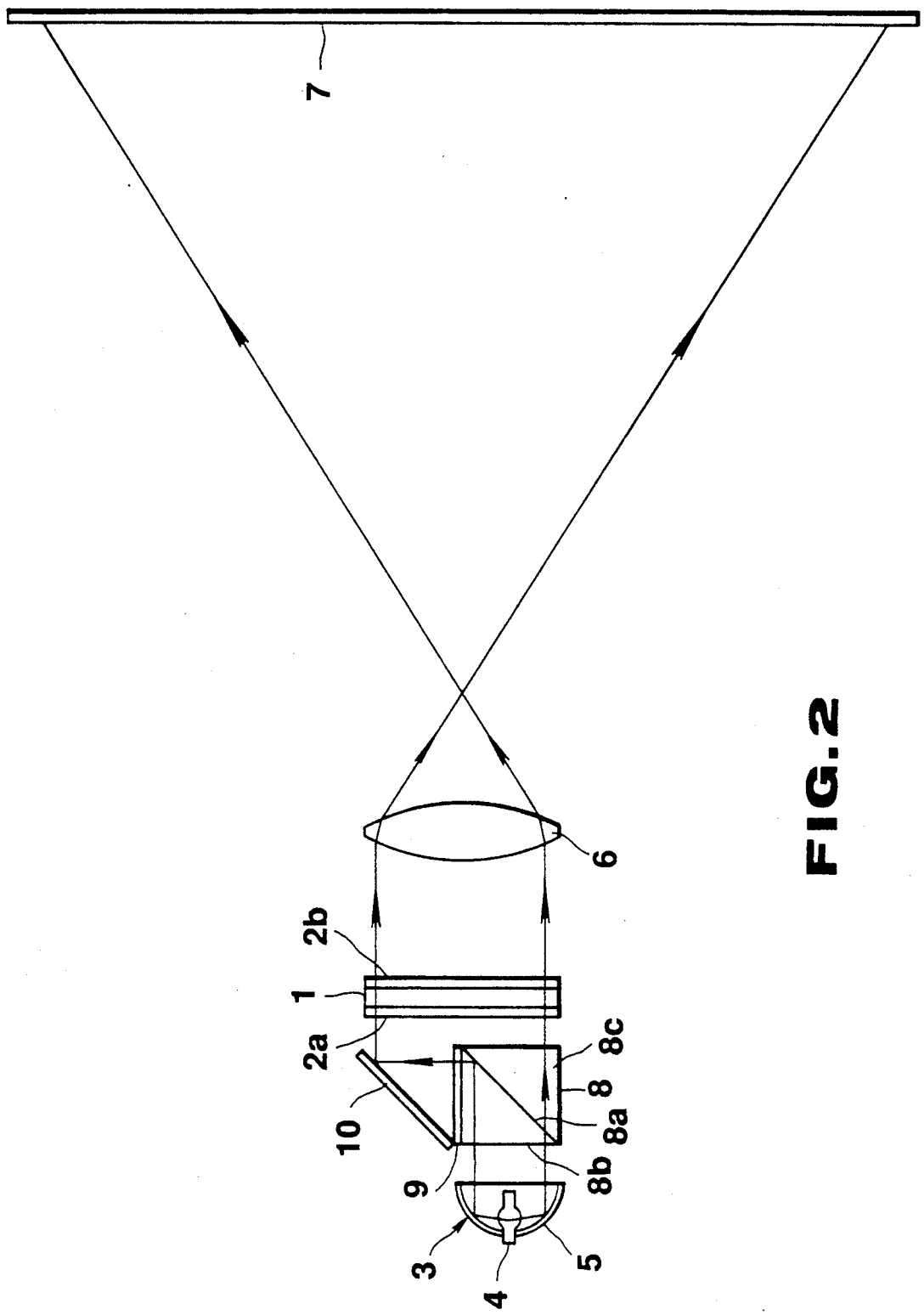
Figure 3:
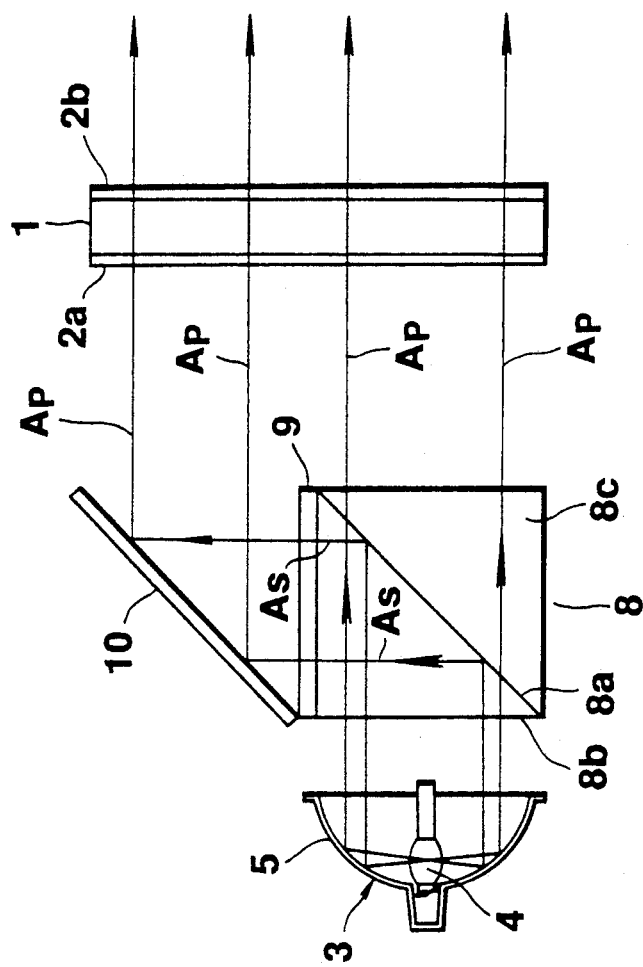

FIGS. 2 and 3 show the first embodiment of the present invention, in which FIG. 2 is a schematic view of a projector liquid crystal display apparatus and FIG. 3 is a view showing in detail a main part in FIG. 2. Referring to FIGS. 2 and 3, reference numeral 1 denotes a TN liquid crystal display panel including polarizing plates 2a and 2b at light incident and output sides, respectively; 3, a light source including a light source lamp 4 and a paraboloidal reflector having a parabolic shape; 6, a projection lens; and 7, a screen. These parts are the same as those of the conventional projector liquid crystal display apparatus shown in FIG. 1. The light source 3, however, has a size (light emission amount) ½ that of the conventional light source.

Reference numeral 8 denotes a polarizing beam splitter for splitting light from the light source 3 into light having a P-polarized component and light having an S-polarized component. The splitter 8 is arranged between the light source 3 and the pane 1. The size of the splitter 8 is about ½ that of the panel 1. Reference numeral 9 denotes a halfwave plate. The plate 9 is arranged between a mirror 10 and the splitter 8. A beam splitter surface 8a (boundary surface between a prism 8b and a prism 8c) reflects the S-polarized light. The mirror 10 reflects the P-polarized light toward the panel 1.

An operation of the projector liquid crystal display apparatus having the above arrangement will be described below. Radiated light from the lamp 4 is reflected by the reflector 5 as light parallel to an optical axis of the reflector 5. This parallel light is incident on the splitter 8. The light incident on the splitter 8 is split into P-polarized light Ap and S-polarized light As by the surface 8a. The P-polarized light Ap is linearly polarized light having an oscillation direction parallel to a drawing surface of FIGS. 2 and 3. The S-polarized light As is linearly polarized light having an oscillation direction perpendicular to the drawing surface. The light Ap is output from the prism 8b through the surface 8a and incident on the panel 1.

The light As reflected from the surface 8a is output from the prism 8c and incident on the plate 9. The oscillation direction of the light As incident on the plate 9 is rotated through substantially 90 degrees by optical rotatory power of the plate 9, and the light As is output as the light Ap. The output light from the plate 9 is reflected by the mirror 10 and incident on the panel 1.

The light Ap from the splitter 8 and the light Ap from the mirror 10 are transmitted through the panel 1 and radiated on the screen 7 through the lens 6. In this embodiment, the light from the light source 3 is incident on the panel 1 without waste light. Therefore, an image projected on the screen 7 is a bright image with high contrast.

The present invention is not limited to the above embodiment. For example, in the above embodiment, the halfwave plate 9 is used for converting the S-polarized light As into the P-polarized light Ap. Two quarter-wave plates, however, may be used to convert the light As into the light Ap. Alternatively, a liquid crystal panel in which liquid crystal molecules are twisted substantially 90 degrees may be used in place of the plate 9. In the above embodiment, light incident on the liquid crystal display panel 1 is linearly polarized light (P-polarized light) having one oscillation direction. Therefore, an image can be displayed on the panel 1 without the polarizing plate 2a at the light incident side. In the above embodiment, the P-polarized light is incident on the panel 1, and a display image on the panel 1 is projected on the screen 7. The present invention, however, is not limited to this arrangement. For example, a TN liquid crystal display panel which displays an image by utilizing S-polarized light can be used. In this case, the S-polarized light As is incident on the panel 1, and a display image on the panel 1 is projected on the screen 7. The P-polarized light Ap output from the splitter 8 is converted into the S-polarized light As by using a halfwave plate or the like.

Figure 4:
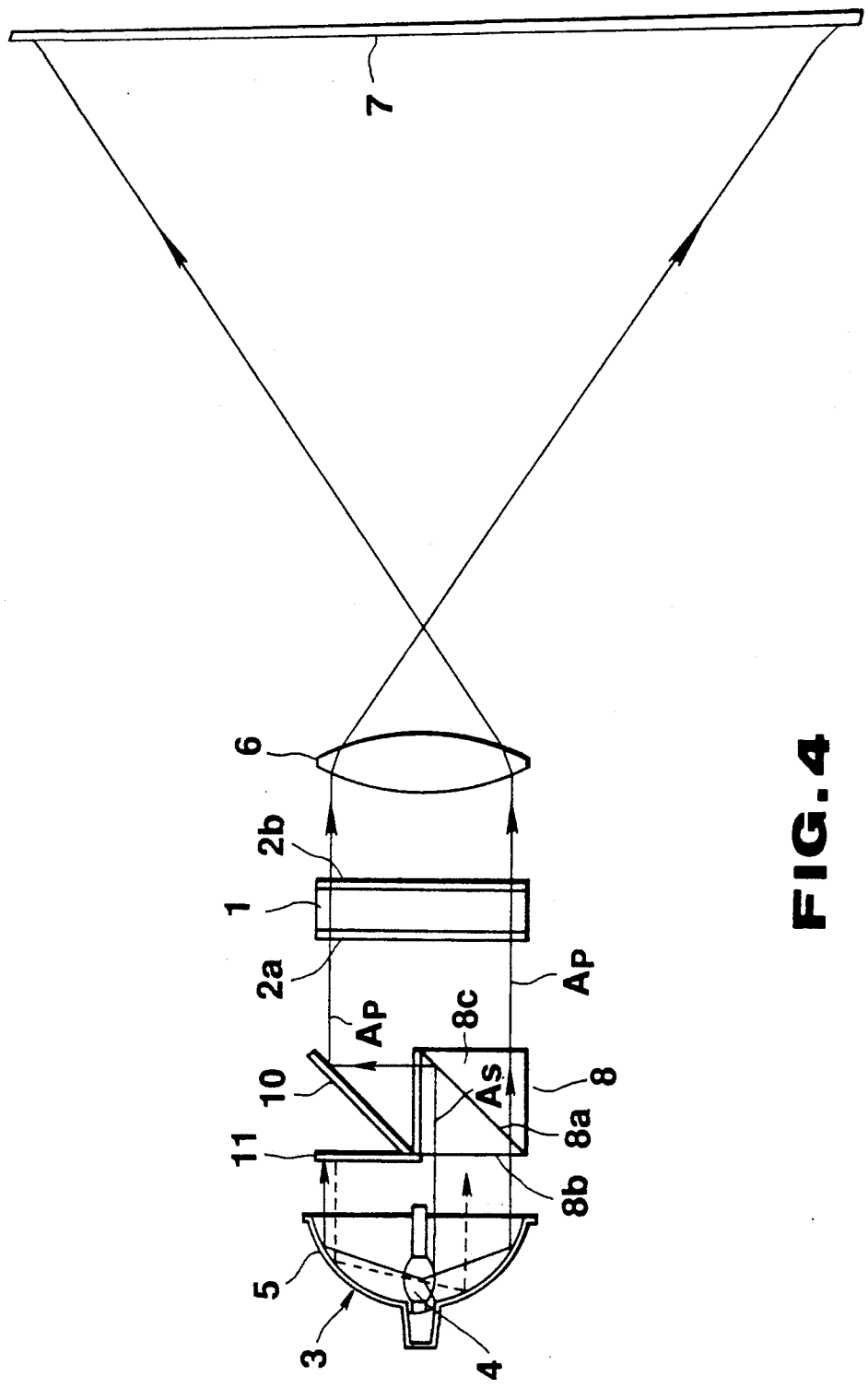
FIG. 4 is a schematic view of a projector liquid crystal display apparatus according to a second embodiment of the present invention.

FIG. 4 shows a second embodiment of the present invention. Referring to FIG. 4, reference numeral 1 denotes a TN liquid crystal display panel; 3, a light source; 6, a projection lens; 7, a screen; 8, a polarizing beam splitter; 9, a halfwave plate; and 10, a mirror. These parts are the same as those in the first embodiment. The light source 3, however, has a size twice that of the first embodiment. Reference numeral 11 denotes a mirror arranged to oppose the light source 3. The size of the mirror 11 is ½ that of a reflector 5.

With the above arrangement, a half of light from the light source 3 is incident on the splitter 8, and the remaining half is radiated on the mirror 11. The light incident on the splitter 8 is split into P-polarized light Ap and S-polarized light As as in the first embodiment. The light Ap is transmitted through a beam splitter surface 8a and incident on the panel 1. The light As is reflected from the surface 8a, converted into the light Ap by the plate 9, and then incident on the panel 1 by the mirror 10.

The light radiated on the mirror 11 is reflected as indicated by a broken line in FIG. 4, returned to the light source 3, and reflected by the reflector 5 of the light source 3. The reflected light is reflected again by the paraboloidal reflector 5 through the center of a light source lamp 4 and incident on the splitter 8.

With the arrangement according to the second embodiment, therefore, the light from the light source 3 can be incident on the panel 1 without waste light, as in the first embodiment. As a result, a displayed image on the panel 1 can be projected and displayed as an image with high luminance and high contrast on the screen 7.

As described above, the liquid crystal display apparatus according to the first or second embodiment of the present invention includes: a polarizing beam splitter for splitting light from a light source into a P-polarized light and an S-polarized light and causing one linearly polarized light to be incident on a liquid crystal display panel; and a polarization direction converter for converting the other linearly polarized light split by the polarizing beam splitter into polarized light in the same direction as the one linearly polarized light and causing the converted light to be incident on the liquid crystal display panel. Therefore, according to the above first and second embodiments, the light from the light source can be incident on the liquid crystal display panel without waste light. As a result, a liquid crystal display apparatus which can display a display image on a liquid crystal display panel as an image having high luminance and high contrast can be provided.

The third embodiment of the present invention will be described below with reference to FIGS. 5 and 6.

Figure 5:
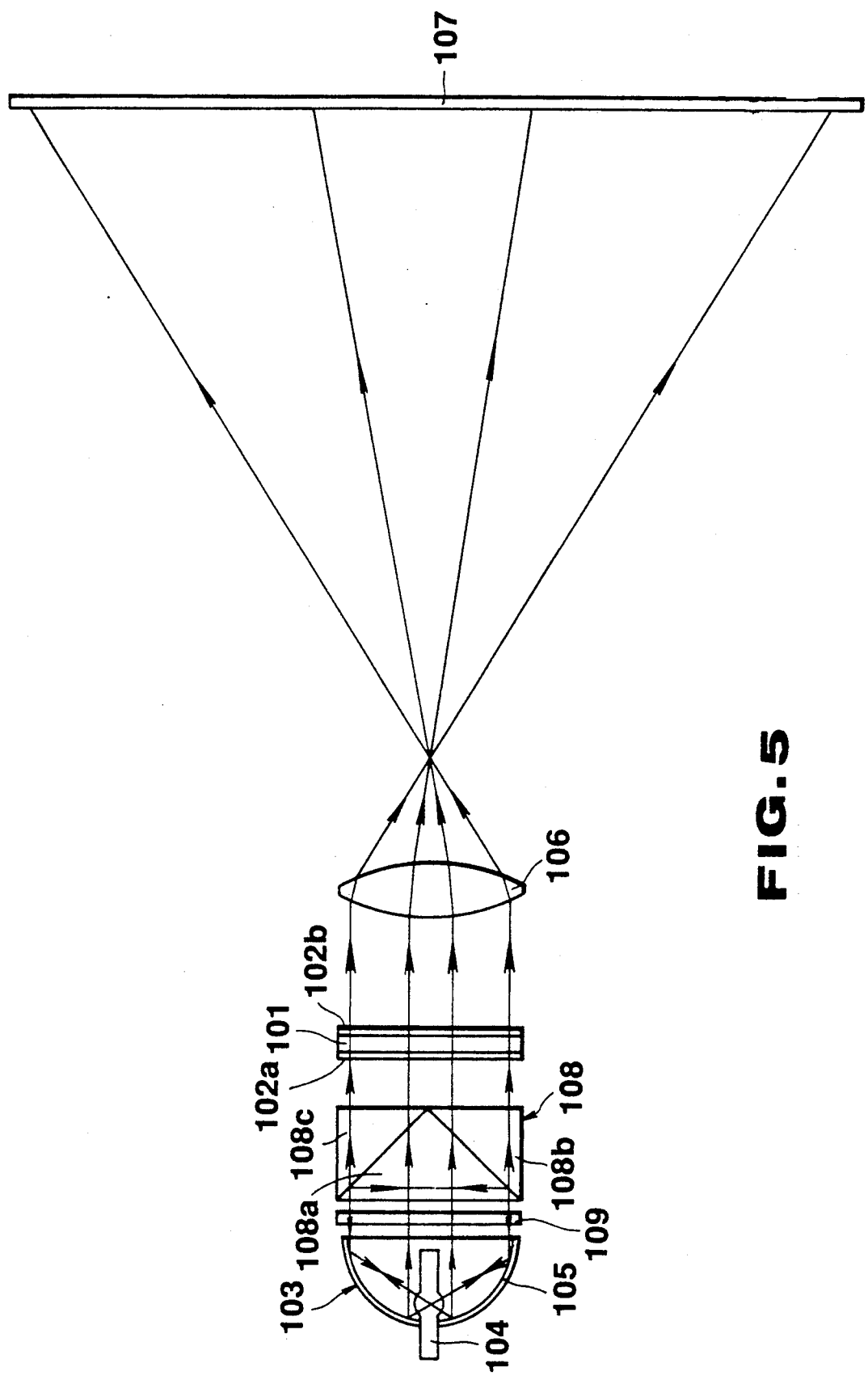
Figure 6:
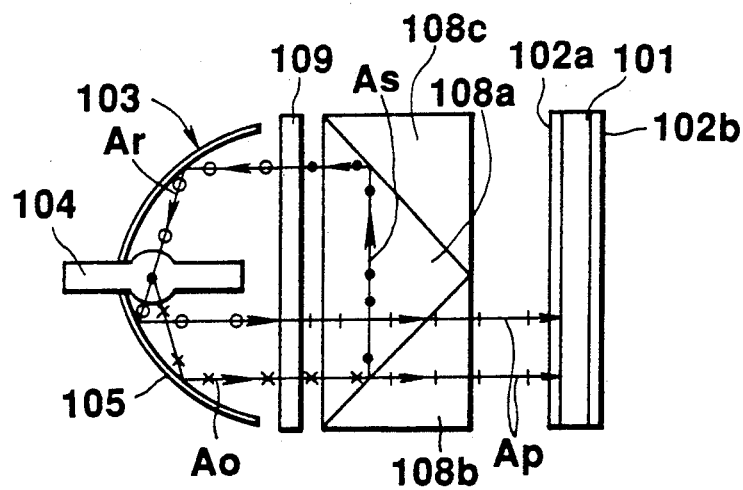

Referring to FIGS. 5 and 6, reference numeral 101 denotes a TN liquid crystal display panel including polarizing plates 102a and 102b of light incident and output surfaces, respectively; 103, a light source including a light source lamp 104 and a paraboloidal reflector 105; 106, a projection lens; and 107, a screen. Arrangements of these parts are the same as those of the conventional projector liquid crystal display apparatus shown in FIG. 1. Reference numeral 108 denotes a polarizing beam splitter arranged between the light source 103 and the liquid crystal display panel 101. Of natural light having random oscillation directions, the splitter 108 transmits an S-polarized light and reflects a P-polarized light toward the light source 103. The splitter 108 is arranged by combining three prisms 108a, 108b, and 108c. Reference numeral 109 denotes a quarter-wave plate, arranged between the splitter 108 and the light source 103, for optically rotating transmitted light through substantially 45 degrees. The plate 109 is arranged such that its optical axis is set at an angle substantially 45 degrees with respect to an oscillation direction of the S-polarized light.

In this projector liquid crystal display apparatus, radiated light from the light source 103 is incident on the panel 101 through the plate 109 and the splitter 108, and a display image on the panel 101 is enlarged and projected on the screen 107 by the lens 106. The radiated light from the light source 103 is incident on the panel 101 as shown in FIG. 6.

That is, light radiated from the light source 103 is incident on the splitter 108 through the plate 109. The light transmitted through the plate 109 is subjected to optical rotatory power of the plate 109. The light from the light source 103 is natural light having various oscillation directions, and the light transmitted through the plate 109 is still natural light. The natural light incident o the splitter 108 is split into P-polarized light Ap and S-polarized light As by beam splitter surfaces (boundary surfaces between the incident side prism 108a and output-side prisms 108b and 108c, respectively) of the splitter 108. The P-polarized light Ap is transmitted through the splitter 108 and incident on the panel 101. The S-polarized light As is reflected by one beam splitter surface of the splitter 108 and then reflected by the other beam splitter surface, which is inclined in a reverse direction, toward the light source 103. The light As reflected by the splitter 108 toward the light source is transmitted through the plate 109 and optically rotated through substantially 45 degrees by optical rotatory power of the plate 109 into circularly polarized light Ar. The light Ar is reflected by the paraboloidal reflector 105 of the light source 103, reflected again by the reflector 105 through the center of the reflector 105 (the center of the lamp 104), and incident on the plate 109 again. The light Ar is optically rotated substantially 45 degrees by the optical rotatory power of the plate 109 into P-polarized light Ap. The light Ap is incident on the splitter 108. The light Ap incident on the splitter 108 is transmitted through the splitter 108 and incident on the panel 101.

In the above projector liquid crystal display apparatus, the radiated light from the light source 103 is incident on the polarizing beam splitter 108 through the quarter-wave plate 109. Of the radiated light from the light source 103, the P-polarized light Ap transmitted through the splitter 108 is directly incident on the liquid crystal display panel 101. The S-polarized light As incident toward the light source 103 by the splitter 108 is optically rotated into circularly polarized light by the plate 109. The circularly polarized light is reflected by the reflector 105 of the light source 103, transmitted through the plate 109 again into the P-polarized light Ap, and incident on the splitter 108. In this manner, if the S-polarized light As reflected by the splitter 108 toward the light source 103 is converted into the P-polarized light Ap and incident on the splitter 108 again, this light can also be incident on the panel 101. The light incident on the panel 101 through the splitter 108 is the P-polarized light Ap. Therefore, by using a panel which performs display by using P-polarized light as the TN liquid crystal display panel 101, all of the P-polarized light Ap transmitted through the splitter 108 is transmitted through the incident-side polarizing plate 102a of the panel 101 and incident on the panel 101. As a result, all of the light Ap transmitted through the splitter 108 can be utilized in display on the panel 101.

According to the projector liquid crystal display apparatus, the radiated light from the light source 103 can be utilized in display on the liquid crystal display panel 101 with almost no waste light.

Figure 7:
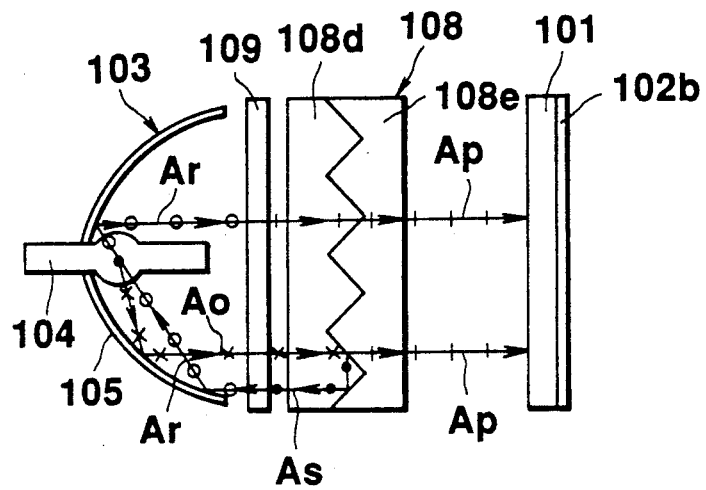
FIGS. 7 and 8 are side views of light sources of liquid crystal display apparatuses according to fourth and fifth embodiments of the present invention, respectively.
Figure 8:
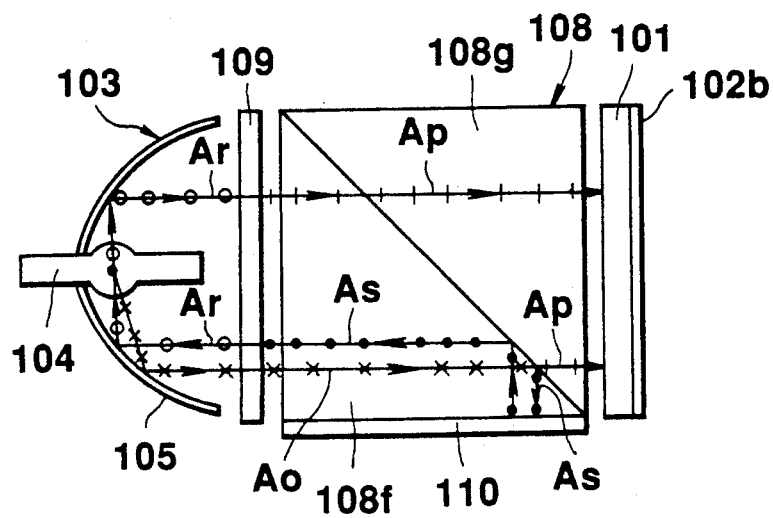

In the third embodiment, the incident-side polarizing plate 102a is located on the light incident surface of the panel 101. The light incident on the panel 101 through the polarizing beam splitter 108, however, is only the P-polarized light Ap as described above. Therefore, even if the polarizing plate 102a is not provided on the light incident surface of the liquid crystal display panel 101, the panel 101 can perform display. In the third embodiment, a splitter arranged by combining the three prisms 108a, 108b, and 108c is used as the polarizing beam splitter 108. Beam splitters of the fourth and fifth embodiments as shown in FIGS. 7 and 8, however, can be used as the polarizing beam splitter 108. The beam splitter shown in FIG. 7 is arranged by combining two prisms 108d and 108e each having a large number of stripe prism portions. The beam splitter shown in FIG.

8 is arranged by combining two triangular prisms 108f and 108g and providing a mirror 110 on a side surface of the incident-side prism 108f. Furthermore, in the third embodiment, the quarter-wave plate 109 is used as an optical rotatory element arranged between the splitter 108 and the light source 103. As the optical rotatory element, however, a liquid crystal panel in which liquid crystal molecules are twisted substantially 45 degrees can be used.

The liquid crystal display apparatus according to the third to fifth embodiments comprises a polarizing beam splitter, arranged between a light source and a display panel, for transmitting light having a P-polarized component of radiated light from the light source and reflecting light having an S-polarized component of the radiated light toward the light source; and an optical rotatory element, arranged between the polarizing beam splitter and the light source, for optically rotating the transmitted light substantially 45 degrees. Therefore, light having an S-polarized component reflected by the polarizing beam splitter toward the light source is converted into P-polarized light and incident on a liquid crystal display panel. Therefore, radiated light from the light source can be utilized in display on the liquid crystal display panel with almost no waste light. As a result, an image with high luminance can be displayed on the screen 107.

A projector liquid crystal display apparatus for projecting a display image on a liquid crystal display panel on an external screen, according to the sixth embodiment of the present invention will be described below with reference to FIG. 9.

Figure 9:
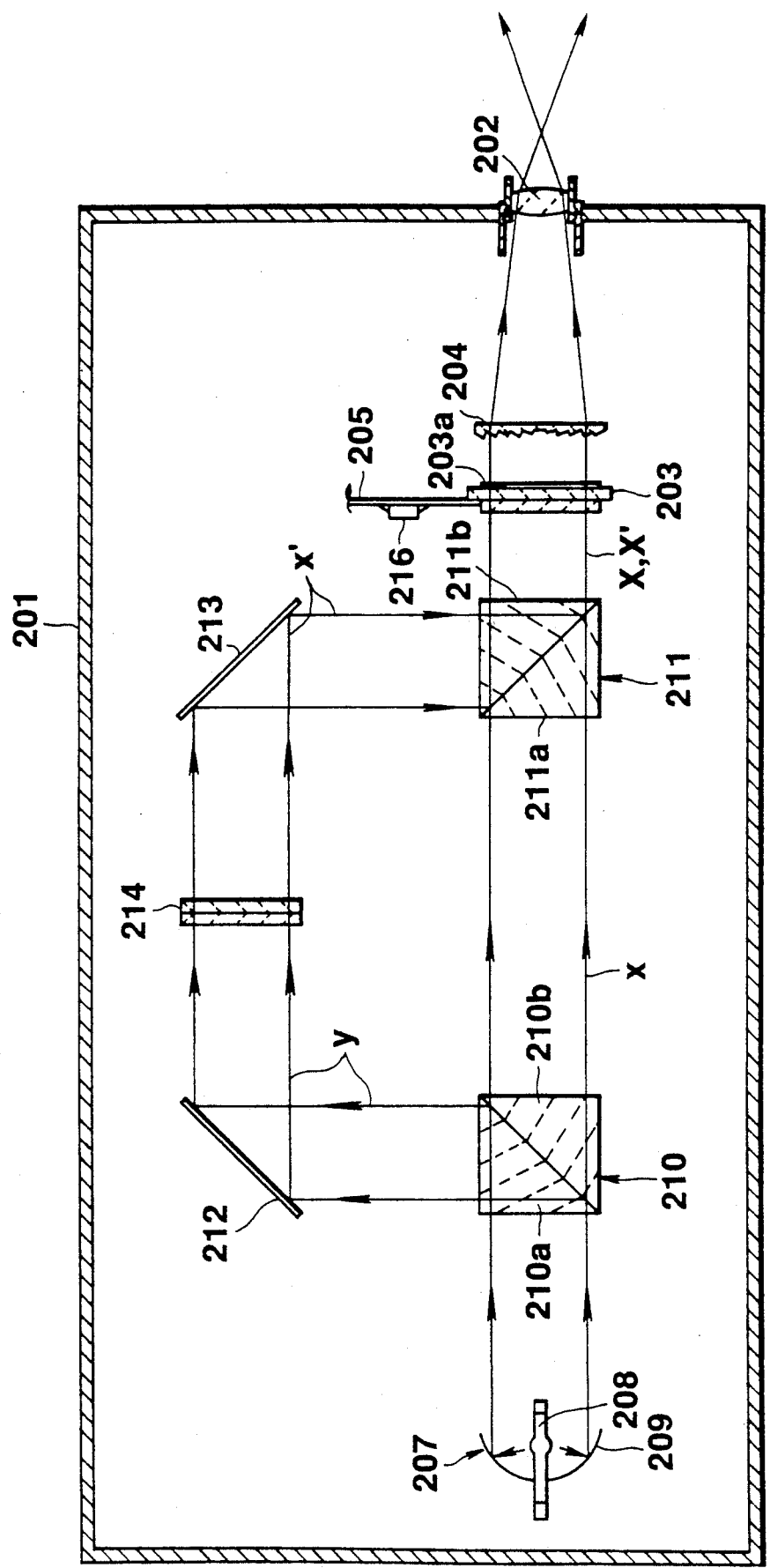
FIG. 9 is a cross-sectional view of a projector liquid crystal display apparatus according to a sixth embodiment of the present invention.

Referring to FIG. 9, reference numeral 201 denotes a case of the liquid crystal display apparatus. A projection lens 202 is located on the front surface of the case 201. Reference numeral 203 denotes a transmission TN liquid crystal display panel arranged substantially vertically in a front portion of the case 201 so as to oppose the lens 202. The liquid crystal display panel 203 is a matrix display panel for displaying a color image such as a television image. A display image on the panel 203 is focused on the projection lens 202 by a condenser lens 204 which is a circular Fresnel lens located before the panel 203. The display image on the panel 203 is projected in an enlarged scale by the projection lens 202 on an external screen (not shown) arranged in front of the display apparatus. Reference numeral 205 denotes a display driving circuit board connected to the panel 203; 206, an LSI chip mounted on the circuit board 205; and 207, a light source arranged in a rear portion of the case 201 so as to oppose the panel 203. The light source 207 includes a high-luminance light source amp 208 such as a halogen lamp or xenon lamp; and a reflector 209 for reflecting light from the lamp 208 toward the panel 203. Note that the reflector 209 is a paraboloidal reflector for reflecting the light from the lamp 208 as parallel light parallel to an optical axis of the reflector.

Reference numerals 210 and 211 denote a light-splitting polarizing beam splitter and a light-synthesizing beam splitter arranged between the light source 207 and the panel 203. The beam splitter 210 is located at the light source 207 side, and the beam splitter 211 is located at the panel 203 side. The beam splitter (also called a polarizing splitting prism) 210 splits light from the light source 207 into ordinary light rays and extraordinary light rays having different oscillation directions. The beam splitter 210 is obtained by bonding two right triangular prisms 210a and 210b having different optic axial directions. That is, the beam splitter 210 transmits one of the ordinary and extraordinary light rays of light incident on the prism 210a to the prism 210b and reflects the other light rays from a bonding surface between the prisms 210a and 210b in a direction perpendicular to an incident direction. In this embodiment, the beam splitter 210 transmits extraordinary light rays x (oscillating in the vertical direction along the drawing surface) and reflects ordinary rays y (oscillating in a direction perpendicular to the drawing surface) toward one side surface of the case 201. Reference numeral 212 denotes a first mirror for reflecting the ordinary light rays y reflect ed by the beam splitter 210 in a direction parallel to an optical path of the extraordinary light rays x transmitted through the beam splitter 210. Reference numeral 213 denotes a second mirror for reflecting the light reflected by the first mirror 212 toward the light-synthesizing beam splitter 211 on the extraordinary light ray optical path. A TN liquid crystal panel 214 is located between the first and second mirrors 212 and 213 and optically rotates the ordinary light rays y, reflected by the first mirror 212, substantially 90 degrees. This panel 214 is obtained by filling a nematic liquid crystal between a pair of transparent plates such that molecules are twisted substantially 90 degrees between the transparent plates. The panel 214 has the same structure as that of a conventional TN liquid crystal display panel except that it does not include display electrodes nor polarizing plates. The plate 214 optically rotates incident ordinary light rays y through substantially 90 degrees, thereby changing the incident light into light rays in the same oscillation direction as extraordinary light rays x transmitted through the polarizing beam splitter 210. The light transmitted through the panel 214 is reflected, as extraordinary light rays x', toward the light-synthesizing beam splitter 211 by the second mirror 213. The beam splitter 211 is obtained by bonding two right triangular prisms 211a and 211b having the same optic axial direction. The beam splitter 211 transmits light incident on the first prism 211a directly to the second prism 211b and reflects light incident on the second prism 211b from a bonding surface between the prisms 211a and 211b in a direction perpendicular to the incident direction. That is, the beam splitter 211 directly transmits the extraordinary light rays x transmitted through the beam splitter 210 and reflects the extraordinary light rays x' reflected by the second mirror 213 in the same direction as the extraordinary light rays x. In this manner, the two extraordinary light rays x and x' are superposed and synthesized into one light beam. The extraordinary light rays x and x' from the beam splitter 211 are incident on the TN liquid crystal display panel 203 for displaying an image.

The panel 203 is arranged to perform display by using extraordinary light rays. In addition, the panel 203 includes a polarizing plate 203a only its light-output side. The polarizing plate 203a is provided at only the light-output side of the panel 203 because only extraordinary light rays are incident on the panel 203. That is, light in the same oscillation direction as that transmitted through a polarizing plate can be incident on the panel 203 without providing a polarizing plate at a light-incident side of the panel 203.

In the above liquid crystal display apparatus, light from the light source 207 is split into extraordinary light rays y and ordinary light rays y by the beam splitter 210. Of the extraordinary and ordinary light rays x and y, the ordinary light rays y not required for display are optically rotated substantially 90 degrees to obtain extraordinary light rays x' by the TN liquid crystal display panel 214, and the extraordinary light rays x' and the extraordinary light rays x split by the beam splitter 210 are synthesized into one light beam by the beam splitter 211 and incident on the liquid crystal panel 203. In this manner, light rays which are cut by a polarizing plate at a light incident surface of a conventional liquid crystal display panel can be used in display on the panel 203.

According to the above liquid crystal display apparatus, therefore, most of light emitted from the light source 207 can be utilized in display on the liquid crystal panel 203, thereby displaying an image with high luminance on the panel 203. In addition, since light incident on the panel 203 consists of only light rays in an oscillation direction, a temperature rise on the panel 203 caused when unnecessary light is absorbed by the incident-side polarizing plate can be prevented.

In the above embodiment, the TN liquid crystal display panel 203 displays images by using extraordinary light rays. The panel 203, however, can be arranged to perform display by using ordinary light rays. In this case, of the extraordinary and ordinary light rays split by the beam splitter 210, the extraordinary light rays are optically rotated to obtain ordinary light rays, and the obtained ordinary light rays and the ordinary light rays split by the beam splitter 210 are synthesized into one light beam by the beam splitter 211 and incident on the panel 203. In the above embodiment, the polarizing beam splitter 210 is used as a light splitting element for splitting the light from the light source 207 into ordinary and extraordinary light rays. The light splitting element, however, is not limited to the polarizing beam splitter. Similarly, an optical rotatory element and light synthesizing element are not limited to the TN liquid crystal display panel and the beam splitter, respectively. In the above embodiments, the polarizing plate 203a is provided at only the light outputting side of the panel 203. If, however, a polarizing plate is arranged at the light incident side of the panel 203, incident light on the panel 203 is not absorbed by but transmitted through this incident-side polarizing plate since the incident light on the panel 203 consists of only light (extraordinary or ordinary light rays) in an oscillation direction used in display. Therefore, the panel 203 may have polarizing plates at its both sides. In the above embodiment, a projector liquid crystal display apparatus for projecting a display image on the panel 203 onto an external screen has been described. The present invention, however, can be applied to a projector liquid crystal display panel for projecting an image on a transmission screen or a non-projector liquid crystal display apparatus in which one surface of a liquid crystal display panel is directly used as a screen.

The liquid crystal display apparatus of the sixth embodiment includes: a transmission type liquid crystal display panel; a light source for emitting light to be incident on the liquid crystal display panel; a light splitting element for splitting the light from the light source into ordinary and extraordinary light rays having different oscillation directions; an optical rotatory element for optically rotating one of the ordinary and extraordinary lights split by the light splitting element through substantially 90 degrees, thereby changing an oscillation direction of the light rays to be the same as an oscillation direction of the other light rays; and a light synthesizing element for superposing the light rays optically rotated by the optical rotatory element and the other light rays into light to be incident on the liquid crystal display panel. Therefore, since most of the light from the light source can be utilized in display on the liquid crystal display panel, an image with high luminance can be displayed on the liquid crystal display panel. In addition, since the light incident on the liquid crystal display panel includes only light rays in an oscillation direction to be used in display, a temperature rise caused when the liquid crystal display panel absorbs unnecessary light can be prevented.

The seventh embodiment of the present invention will be described in detail below.

Figure 10:
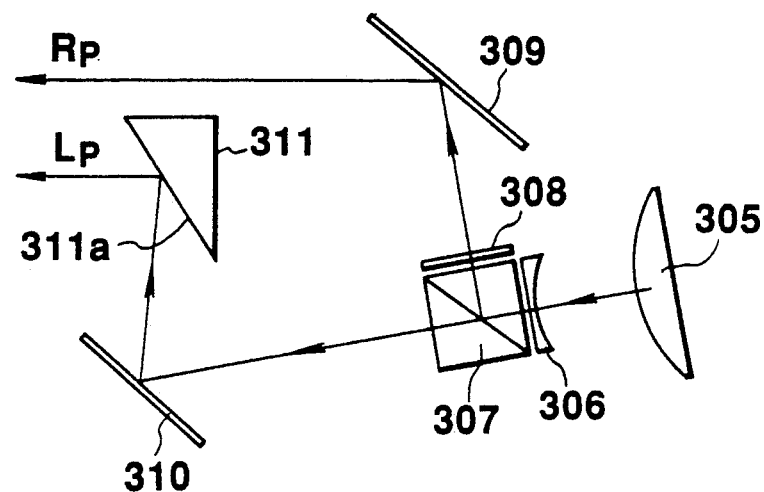
FIG. 10 is a schematic view showing a seventh embodiment of the present invention.

FIG. 10 shows an arrangement of the seventh embodiment of the present invention. A convex cylindrical lens 305 is a convex lens for focusing divergent light from a light source lamp (not shown). A concave cylindrical lens 306 is a concave lens for converting convergent light rays focused by the convex cylindrical lens 305 into collimated light rays. A polarizing beam splitter 307 splits the incident collimated light rays from the concave cylindrical lens 306 into two linearly polarized light components, i.e., P-polarized light and S-polarized light and sends them in different directions. A halfwave plate 308 is arranged such that its plate surface is perpendicular to a propagation direction of the S-polarized light propagating upward in FIG. 10 from the polarizing beam splitter 307 and its optical axis forms an angle of $\pi/4$ radians with respect to an oscillation direction of the incident light. A mirror 309 is a mirror having high reflectivity for changing a propagation direction of the linearly polarized light from the halfwave plate 308. A mirror 310 is a mirror, having a high reflectivity similar to the mirror 309, for changing a propagation direction of the linearly polarized light (P-polarized light) propagating from the polarizing beam splitter 307 to the left of FIG. 10. A deposition prism 311 reflects the linearly polarized light reflected by the mirror 310 from its deposition surface 311a and sends the light parallel to light Rp reflected from the mirror 309. The reflectivity of the deposition surface 311a is set equal to the transmittivity of the halfwave plate 308. Although not shown, a liquid crystal display panel is arranged to be perpendicularly irradiated with light rays reflected by the mirror 309 and the deposition prism 311. A transmission axis of a polarizing plate at an incident side of the liquid crystal display panel is arranged parallel to the drawing surface of FIG. 10.

An operation of this embodiment having the above arrangement will be described below.

A light emitted from the light source lamp (not shown) is focused by the convex cylindrical lens 305, converted into collimated light rays by the concave cylindrical lens 306, and is then incident on the polarizing beam splitter 307. That is, collimated light having a large light amount are incident on the beam splitter 307. The collimated light are split into P-polarized light and S-polarized light and output in different directions by the beam splitter 307. The S-polarized light is incident on the halfwave plate 308 whose optical axis forms an angle of $\pi/4$ radians with respect to an oscillation plane of the polarized light, and is output as P-polarized light whose oscillation plane is rotated through $\pi/2$. Thereafter, this polarized light is reflected by the mirror 309 and propagates in a different direction. A propagation direction of the P-polarized light from the beam splitter 307 is changed by the mirror 310 and then changed by the deposition surface 311a of the deposition prism 311. Therefore, this P-polarized light propagates in the same direction as the P-polarized light reflected from the mirror 309. Both the linearly polarized light Rp reflected from the mirror 309 and the linearly polarized light Lp reflected from the deposition prism 311 are P-polarized light, and synthesized and radiated on the liquid crystal display panel. The polarized light Rp mainly radiates an upper portion in FIG. 10 of the liquid crystal panel, while the polarized light Lp mainly radiates a lower portion in FIG. 10 of the liquid crystal display panel. Since, however, the light transmittivity of the halfwave plate 308 and the light reflectivity of the deposition surface 311a are equal to each other, no difference is produced in radiated light amounts between the upper and lower portions of the liquid crystal display panel. In addition, since a transmission axis of the polarizing plate at the incident side of the liquid crystal display panel transmits the P-polarized light, both of the light Rp and Lp are incident on the liquid crystal display panel. Therefore, a display image obtained by this embodiment is bright, and its brightness is uniform in upper and lower portions.

Figure 11:
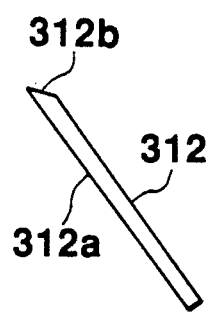
FIG. 11 is a schematic view showing a structure of a mirror usable instead of a deposition prism shown in FIG. 10.

The deposition surface 311a is utilized only as a mirror. Therefore, the prism 311 may be replaced with another member, e.g., a mirror. For example, as shown in FIG. 11, a mirror 312 having a cut portion 312b at its upper portion and a mirror deposition surface 312a having high reflectivity on its surface may be used.

Figure 12:
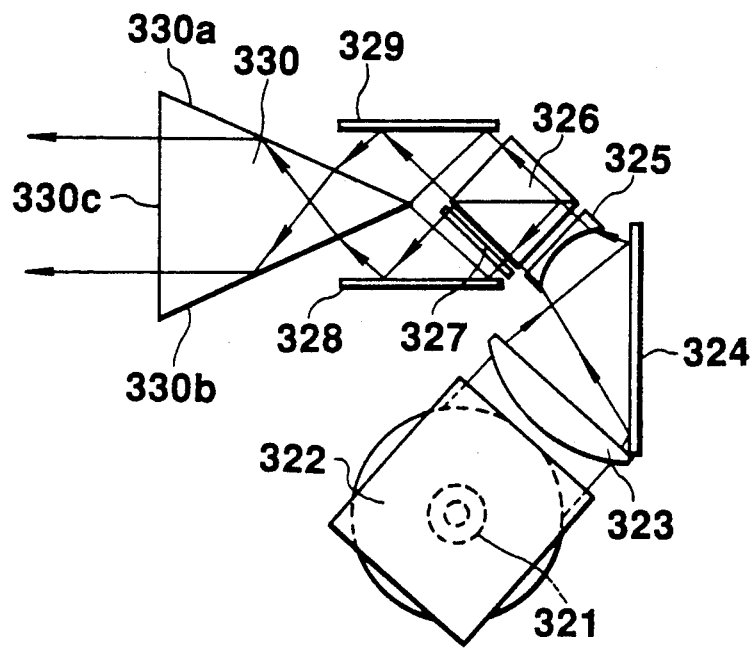
FIG. 12 is a schematic view of an eighth embodiment of the present invention.

The eighth embodiment of the present invention will be described below. FIG. 12 shows an arrangement of a projector according to the eight embodiment. Referring to FIG. 12, a cold mirror 322 reflects light from a light source lamp 321 so as to be incident on a convex cylindrical lens 323. The lens 323 is a condenser for focusing the incident light rays. A mirror 324 changes a propagation direction of the focused light beam from the lens 323 to cause the light beam to be incident on a concave cylindrical lens 325. The lens 325 outputs the incident focused light beam as a collimated light beam to be incident on a polarizing beam splitter 326. The beam splitter 326 is a prism for splitting the incident light into two linearly polarized light components whose polarization planes are perpendicular to each other and outputting them in different directions. A halfwave plate 327 is arranged such that its plate surface is perpendicular to a propagation direction of the linearly polarized light propagating from the beam splitter 326 toward a lower left portion of FIG. 12 and its optical axis forms an angle of π/4 radians with respect to an oscillation direction of the incident linearly polarized light. Mirrors 328 and 329 are arranged parallel to each other such that their reflecting surfaces oppose each other. The mirrors 328 and 329 are high-reflectivity mirrors. The linearly polarized light from the beam splitter 326 is incident directly and via the halfwave plate 327 on the mirrors 329 and 328 at an incident angle. A synthesizing prism 330 is for synthesizing the linearly polarized light reflected from the mirrors 328 and 329 and outputting them as a beam of parallel light rays. Note that as in the above embodiment, a transmission axis of a polarizing plate at an incident side of a liquid crystal display panel 301 (not shown) irradiated w th the linearly polarized light from the prism 330 is arranged parallel to an oscillation direction of the linearly polarized light output from the prism 330.

Figure 13:
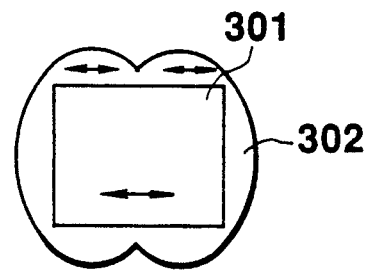
FIG. 13 is a view showing a radiation state of a liquid crystal display panel of the eighth embodiment.

An operation of this embodiment will be described below. An infrared component of divergent light from the light source lamp 321 is removed by the cold mirror 322, and the propagation direction of the remaining light is changed. This divergent light is incident on the lens system including the convex cylindrical lens 323, the mirror 324, and the concave cylindrical lens 325. The light incident on the lens system is converted into focused collimated light rays by the lens system. That is, collimated light rays having a large light amount are incident on the beam splitter 326. The beam splitter 326 splits the incident light into P-polarized light and S-polarized light and outputs them in different directions. The P-polarized light output from the beam splitter 326 is reflected by the mirror 329, and incident on the synthesizing prism 330 from a prism surface 330a. The incident light is totally reflected by a prism surface 330b, and output from a lower portion of a prism surface 330c so as to be perpendicular to the surface 330c. The S-polarized light output from the beam splitter 326 is converted into P-polarized light by the halfwave plate 327. The P-polarized light from the plate 327 is reflected by the mirror 328, incident on the synthesizing prism 330 from the prism surface 330b, totally reflected by the prism surface 330a, and output from an upper portion of the prism surface 330c so as to be perpendicular to the surface 330c. That is, the two linearly polarized light components output from the beam splitter 326 are synthesized by the synthesizing prism 330 and output as P-polarized light from the prism surface 330c in a direction perpendicular to the surface so as to diverge as indicated by reference numeral 302 shown in FIG. 13. Since the polarizing plate at the incident side of the liquid crystal panel is arranged to receive the P-polarized light, the linearly polarized light from the prism 330 is transmitted through the polarizing plate with almost no light amount loss. According to this embodiment, since light is focused by the lens system including the convex cylindrical lens 323, the mirror 324, and the concave cylindrical lens 325 and all the light incident on the polarizing beam splitter 326 is incident as P-polarized light on the liquid crystal panel, a bright image can be obtained.

In the above embodiment, the halfwave plate 327 is arranged between the beam splitter 326 and the mirror 328 in order to convert the S-polarized light from the beam splitter 326 into the P-polarized light before its propagation direction is change upon reflection by the mirror 328. The S-polarized light, however, may be converted into the P-polarized light by another method. For example, the halfwave plate 327 may be arranged at an upper portion or the like of the prism surface 330c of the prism 330 to convert the S-polarized light into the P-polarized light.

As described above, according to the liquid projector of this embodiment, divergent light from the light source lamp is focused into collimated light and split into two linearly polarized light components whose polarization planes are perpendicular to each other. One of the two linearly polarized light components is transmitted through the halfwave plate so that its polarization direction becomes parallel to that of the other linearly polarized light. The two light components are then synthesized, and the synthesized light is radiated on the liquid crystal panel which transmits the linearly polarized light. Therefore, a liquid crystal projector in which light from the light source lamp can be utilized without waste light and brightness of an image is significantly increased can be provided.

A projector liquid crystal display apparatus according to the ninth embodiment of the present invention will be described below with reference to FIGS. 14 to 16.

Referring to FIG. 14, reference numeral 410 denotes a TN or STN (Super Twisted Nematic) liquid crystal display panel; and 412, a light source. The light source 412 includes a high-luminance light source lamp 413 and a paraboloidal reflector 414. The light source 412 is arranged to form an angle of substantially 45 degrees with respect to a display surface of the panel 410. A cylindrical convex lens 415 for focusing collimated light from the light source 412 is arranged before the light source 412. A cylindrical concave lens 416 for converting the light focused by the cylindrical convex lens 415 into collimated light is arranged before the lens 415. Reference numeral 417 denotes a polarizing beam splitter arranged at an output side of the cylindrical concave lens 416. The beam splitter 417 is obtained by adhering inclined surfaces of two right triangular prisms 417a and 417b. The adhered surface between the prisms 417a and 417b from a polarizing beam splitter surface 418. The beam splitter 417 is arranged such that the surface 418 is inclined substantially 45 degrees with respect to an optical axis of the collimated light output from the lens 416. The beam splitter 417 splits light (natural light including light components in various oscillation directions) L incident from the light source 412 on the beam splitter 417 through the lenses 415 and 416 into two linearly polarized light components whose polarization directions are perpendicular to each other, i.e., into a P-polarized light Lp and an S-polarized light Ls. Of the light L from the light source 412, the P-polarized light Lp is transmitted through the beam splitter surface 418 and output from an output-side boundary surface opposing an incident-side boundary surface. The S-polarized light Ls is reflected by the surface 418 and output from an output-side boundary surface perpendicular to the output-side boundary surface of the P-polarized light Lp. Note that in FIG. 14, one of the light components split by the beam splitter 417 is indicated by a solid line, and the other light component is indicated by an alternate long and short dashed line, for easier understanding.

Reference numeral 419 denotes an optical rotatory element arranged to oppose one of the two output-side boundary surfaces of the beam splitter 417, e.g., the output-side boundary surface of the S-polarized light Ls. This optical rotatory element 419 is, e.g., a halfwave plate. The halfwave plate 419 rotates a polarization direction of the S-polarized light Ls λ/2 radians and outputs the light Ls. When the S-polarized light Ls is incident on the plate 419, the S-polarized light Ls is converted into P-polarized light Lp' in the same polarization direction as the P-polarized light Lp transmitted through the beam splitter 417.

Reference numeral 420 denotes a light synthesizing unit for synthesizing the P-polarized light (to be referred to as first P-polarized light hereinafter) Lp transmitted through the beam splitter 417 and the light (to be referred to as second P-polarized light hereinafter) Lp' obtained by converting the S-polarized light into the P-polarized light by rotating the polarization direction the λ/2 radians by the plate 419 into one light beam. The light synthesizing unit 420 is constituted by a light synthesizing prism plate 421, and optical paths 423a and 423b for causing the first and second P-polarized light Lp and Lp' to be incident on the prism plate 421. The plate 421 is obtained by continuously forming a large number of isosceles triangular micro prisms 422 parallel to each other on one surface of a transparent plate such as a glass plate. The prism plate 421 is arranged parallel to the liquid crystal display panel 410 such that an incident-side boundary surface on which the micro prisms 422 are formed opposes the beam splitter 417 and a flat output-side boundary surface opposes the panel 410. The optical paths 423a and 423b for causing the first and second P-polarized light Lp and Lp' to be incident on the prism plate 421 have mirrors 424a and 424b, respectively. The mirrors 424a and 424b reflect the first and second P-polarized light Lp and Lp' toward almost the entire area of the incident-side boundary surface of the prism plate 421, respectively. Angles of the mirrors 424a and 424b with respect to the incidentside boundary surface of the plate 421 are set such that output directions of the P-polarized light Lp and Lp' incident on the plate 421 and refracted and output by the micro prisms 422 as shown in FIG. 15 become parallel to each other and substantially perpendicular to the liquid crystal display panel 410.

As shown in FIG. 16, the panel 410 is arranged such that a transmission axis A of its incident-side polarizing plate becomes parallel to an oscillation direction P of the P-polarized light Lp and Lp' synthesized by the plate 421.

According to the projector of this embodiment, the light L from the light source 412 are split into the P-polarized light Lp and the S-polarized light Ls whose polarization directions are perpendicular to each other by the polarizing beam splitter 417; the polarization direction of the S-polarized light Ls is rotated λ/2 radians by the halfwave plate 419 so a to be converted into the the same polarization direction as that of the P-polarized light Lp; the two components of linearly polarized light (P-polarized light) Lp and Lp' having the same polarization direction are synthesized into one light beam by the light synthesizing unit 420; and the synthesized light is incident on the liquid crystal panel 410. Light transmitted through the panel 410, i.e., an image displayed on the panel 410 is enlarged by a projection lens (not shown) arranged before the panel 410 and projected on a screen surface (not shown).

The projector liquid crystal display apparatus of this embodiment splits the light L from the light source 412 into the P-polarized light Lp and the S-polarized light Ls; converts the S-polarized light Ls into the P-polarized light Lp'; and synthesizes the P-polarized light (second P-polarized light) Lp' and the P-polarized light (first P-polarized light) Lp into one light beam and causes the light beam to be incident on the liquid crystal display panel 410. Therefore, most of the light from the light source 412 can be incident on the panel 410 as linearly polarized light (P-polarized light) in the same oscillation direction. Therefore, if the transmission axis of the incident-side polarizing plate of the panel 410 is set parallel to the oscillation direction P of the P-polarized light Lp and Lp', most of the light from the light source 412 can be transmitted through the incident-side polarizing plate and incident on the panel 410. In addition, in this projector liquid crystal display apparatus, the light synthesizing unit 420 is constituted by the light synthesizing prism plate 421 in which the large number of isosceles triangular micro prisms 422 are continuously arranged parallel to each other on one surface; and the optical paths 423a and 423b for causing the first and second P-polarized light Lp and Lp' to be incident on the prism plate 421. For this reason, the first and second P-polarized light Lp and Lp' can be superposed and synthesized into one light beam by the plate 421. Therefore, the intensity of light incident on the panel 410 is the total intensity of the two linearly polarized light components split by the beam splitter 417. According to the projector liquid crystal display apparatus, therefore, since light from the light source 412 can be efficiently utilized in display on the panel 410, the panel 410 can display an image with high luminance, and this high-luminance image can be projected on a screen surface.

In the above embodiment, the collimated light beam from the light source 412 is focused by the cylindrical convex lens 415, converted into collimated light beam by the cylindrical concave lens 416, and then incident on the polarizing beam splitter 417. That is, by focusing the light beam from the light source 412, a light ray density per unit area of this light beam can be increased. Therefore, since the intensity of light incident on the beam splitter 417 can be increased higher than that of light from the light source 412, the luminance of a display image on the panel 410 can be further increased.

In the above embodiment, the S-polarized light Ls of the two linearly polarized light components split by the beam splitter 41 is converted into the P-polarized light Lp', and the P-polarized light is incident on the panel 410. To the contrary, the P-polarized light of the two linearly polarized light components split by the beam splitter 417 may be converted into the S-polarized light so that the S-polarized light is incident on the panel 410. In this case, the transmission axis A of the incident-side polarizing plate of the panel 410 is set parallel to the oscillation direction of the S-polarized light.

In the above embodiment, a halfwave plate is used as the optical rotatory element 419. This optical rotatory element, however, may be a TN liquid crystal panel, for example, obtained by filling liquid crystal molecules twisted substantially 90 degrees between a pair of transparent substrates.

In the above embodiment, the projector liquid crystal display apparatus for projecting/displaying a display image on the liquid crystal display panel 410 onto a screen surface has been described. The present invention, however, is not limited to the projector type but can be applied to a liquid crystal display apparatus such as a liquid crystal television receiver in which a light output surface of the liquid crystal display panel 410 is used as a screen.

The liquid crystal display apparatus of this embodiment comprises: a polarizing beam splitter for splitting light from a light source into two linearly polarized light components whose polarization directions are perpendicular to each other; an optical rotatory element for rotating a polarization direction of one of the two linearly polarized light components split by the polarizing beam splitter $\pi/2$ radians; synthesizing unit for synthesizing the other one of the two linearly polarized light components split by the polarizing beam splitter and the linearly polarized light whose polarization direction is rotated through the $\pi/2$ radians by the optical rotatory element into one light beam and causing the light beam to be incident on the liquid crystal display panel. In addition, the transmission axis of the incident-side polarizing plate of the liquid crystal display panel is set parallel to the oscillation direction of the linearly polarized light synthesized by the light synthesizing unit. The light synthesizing unit is constituted by a light synthesizing prism plate obtained by continuously forming a large number of triangular prisms parallel to each other on its one surface, and optical paths for causing the two linearly polarized light components to be incident on the light synthesizing prism plate. Therefore, since light from the light source can be efficiently utilized in display on the liquid crystal display panel, an image can be displayed on the liquid crystal display panel with high luminance.

A projector liquid crystal display apparatus for projecting a display image on a liquid crystal display panel onto an external screen surface, according to the tenth embodiment of the present invention will be described below with reference the accompanying drawings.

Figure 17:
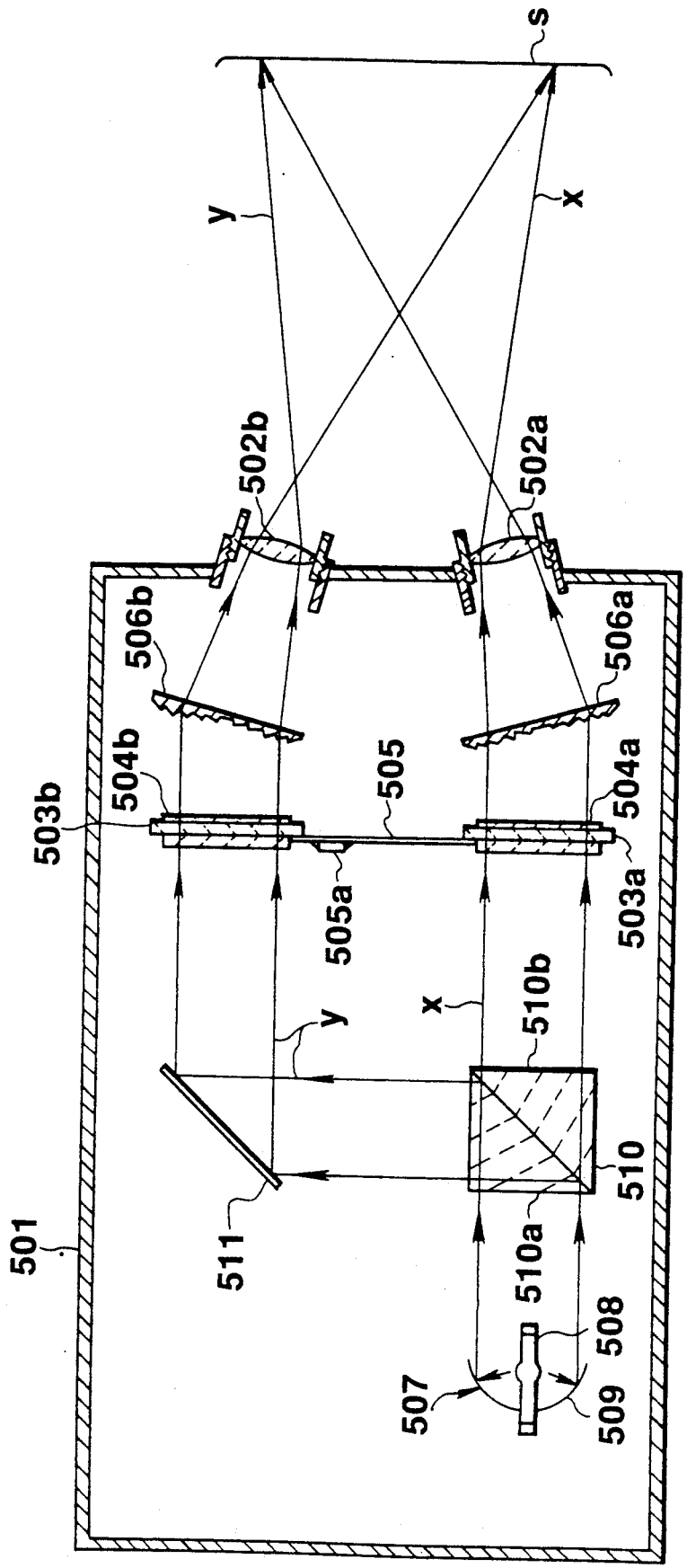
FIG. 17 is a cross-sectional view of a projector liquid crystal display apparatus according to a tenth embodiment of the present invention.

Referring to FIG. 17, reference numeral 501 denotes a case of the projector liquid crystal display apparatus. Two projection lenses 502a and 502b are arranged on the front surface of the case 501. The lenses 502a and 502b are arranged such that their optical axes coincide with each other on the surface of an external screen S located in front of the apparatus. Reference numerals 503a and 503b denote transmission TN liquid crystal display panes arranged in a front portion of the case 501 in correspondence with the lenses 502a and 502b, respectively. The panels 503a and 503b are matrix display panels for displaying a color image such as a television image. The panels 503a and 503b display the same image. Reference numeral 505 denotes a display driving circuit board, connected to the two panels 503a and 503b, for simultaneously driving the panels 503a and 503b; 505a, an LSI chip mounted on the circuit board 505; and 506a and 506b, condenser lenses comprising circular Fresnel lenses and arranged before the panels 503a and 503b with the same inclination angles as the projection lenses 502a and 502b, respectively. Display images on the panels 503a and 503b are relayed to the projection lenses 502a and 502b by condenser lenses 504a and 504b, projected in an enlarged scale on the screen S by the lenses 502a and 502b, respectively, and superposed on the screen S.

Reference numeral 507 denotes a light source arranged in a rear portion of the case 501 to oppose one of the two panels 503a and 503b, i.e., the first liquid crystal display panel 503a. The light source 507 comprises a high-luminance light source lamp 508 such as a halogen lamp or xenon lamp, and a reflector 509 for reflecting light from the lamp 508 toward the first panel 503a. The reflector 509 is a paraboloidal reflector for reflecting the light from the lamp 508 as light parallel to a reflector optical axis. Reference numeral 510 denotes a light splitting polarizing beam splitter arranged between the light source 507 and the first panel 503a; and 511, a mirror obliquely arranged to oppose the beam splitter 510 and the second panel 503b. The beam splitter 510 and the mirror 511 constitute an optical system for causing the light from the light source 507 to be incident on the two liquid crystal display panels 503a and 503b. The beam splitter (also called a "polarizing splitting prism") 510 splits the light from the light source 507 into ordinary light rays and extraordinary light rays having different oscillation directions. The beam splitter 510 is obtained by bonding two right triangular prisms 510a and 510b having different optic axial directions. The beam splitter 510 transmits one of the ordinary and extraordinary light rays of the light incident on the first prism 510a directly to the second prism 510b, and reflects the other light rays from a bonding surface between the first and second prisms 510a and 510b in a direction perpendicular to an incident direction. In this embodiment, the beam splitter 510 transmits extraordinary light rays x (light oscillating in the vertical direction along the drawing surface of FIG. 17) to be incident on the first panel 503a, and reflects ordinary light rays y (light oscillating in a direction perpendicular to the drawing surface) toward one side surface of the case 501. The mirror 511 reflects the ordinary light rays y, reflected by the beam splitter 510, in a direction parallel to an optical path of the extraordinary light rays x transmitted through the beam splitter 510 so as to be incident on the second panel 503b.

The first panel 503a displays images using extraordinary light rays, while the second panel 503b displays images using ordinary light rays. The panels 503a and 503b include polarizing plates 504a and 504b at only their light output sides, respectively. Light from the light source 507 is split into the extraordinary and ordinary light rays x and y by the above optical system, only the extraordinary light rays are incident on the first panel 503a, and only the ordinary light rays y are incident on the second panel 503b. Therefore, without providing polarizing plates at light incident sides of 503a and 503b, light having the same oscillation direction as the light transmitted through the polarizing plate can be incident on each of the panels 503a and 503b. For this reason, the polarizing plates need only be located only before the panels 503a and 503b.

An operation of the projector liquid crystal display apparatus having the above arrangement will be described below. Light from the light source 507 is split into the extraordinary light rays x and the ordinary light rays y by the light splitting polarizing beam splitter 510. The extraordinary light rays x directly transmitted through the beam splitter 510 are incident on the first liquid crystal display panel 503a. Light transmitted from the first panel 503a, i.e., a display image on the first pane 503a is projected in an 502a via the condenser lens 506a. The ordinary light rays y reflected and split from the extraordinary light rays x by the beam splitter 510 are incident on the second liquid crystal display pane 503b for performing display by using ordinary light rays. Light transmitted through the second panel 503b, i.e., a display image on the second panel 503b is projected in an enlarged scale on the screen S by the projection lens 502b via the condenser lens 506b. The display image on the second panel 503b is superposed on the projected image from the first panel 503a on the screen S.

In this projector liquid crystal display apparatus: light from the light source 507 is split into the extraordinary light rays x and the ordinary light rays y by a light splitting element; one of the split light rays (extraordinary light rays x) are incident on the first liquid crystal display panel 503a of the two liquid crystal display panels 503a and 503b for displaying the same image; the other light rays (ordinary light rays y) are incident on the second liquid crystal display panel 503b; and display images on the two panels 503a and 503b are projected on the screen S by the projection lenses 502a and 502b, respectively, thereby displaying an image obtained by superposing the two images on the screen S. According to this projector liquid crystal display apparatus, only the extraordinary or ordinary light rays x or y can be incident on each of the two panels 503a and 503b. Therefore, if each of the panels 503a and 503b is arranged to perform display by using the corresponding incident light rays, all the light incident on the panels 503a and 503b can be used in display.

In this projector liquid crystal display apparatus, light rays which are cut by a polarizing plate located at a light incident side of a liquid crystal display panel in a conventional apparatus are split before they are incident on a liquid crystal display panel, and the split light rays are incident on another liquid crystal display panel so as to be used in display. Therefore, light from the light source 507 can be utilized without waste light. In addition, since the image displayed on the screen S is obtained by superposing the display images on the two panels 503a and 503b, a screen-projected image is a high-luminance image obtained by superposing two light components transmitted through the two panels 503a and 503b. Furthermore, according to this projector liquid crystal display apparatus, light incident on the two panels 503a and 503b consists of only light rays in an oscillation direction to be used in display. Therefore, a temperature rise of the liquid crystal display panel caused when the polarizing plate at the light output side absorbs unnecessary light can be prevented.

In the above tenth embodiment, of the two liquid crystal display panels, the first panel 503a performs display by using the extraordinary light rays x, and the second panel 503b performs display by using the ordinary light rays y. The two panels 503a and 503b, however, may be arranged to perform display using light in the same oscillation direction. In this case, of the extraordinary and ordinary light rays, light rays which cannot be used in display on the liquid crystal panel without changing its oscillation direction are optically rotated substantially 90 degrees and then incident on the liquid crystal display panel.

Figure 18:
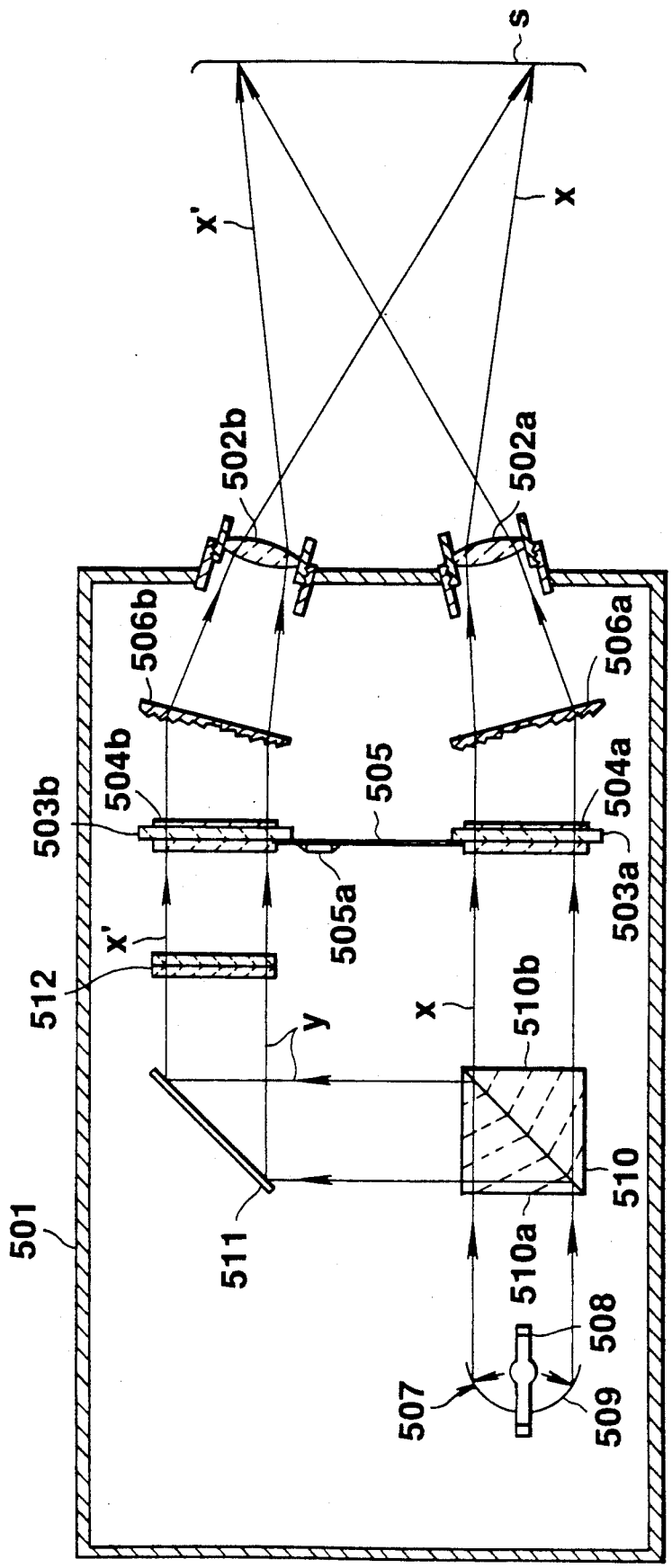
FIG. 18 is a cross-sectional view of a projector liquid crystal display apparatus according to an 11th embodiment of the present invention.

FIG. 18 shows the 11th embodiment of the present invention. In this embodiment, both of two liquid crystal display panels 503a and 503b perform display by using extraordinary light rays. In addition, of extraordinary light rays x and ordinary light rays y split by a light splitting polarizing beam splitter 510, the ordinary light rays y are optically rotated substantially 90 degrees by an optical rotatory TN liquid crystal panel 512 and incident as extraordinary light rays x' on the second liquid crystal display panel 503b. Other arrangements are the same as those of the tenth embodiment. Note that the panel 512 is obtained by filling a nematic liquid crystal between a pair of transparent plates such that molecules of the crystal are twisted between the two transparent plates. The panel 512 has the same structure as a conventional TN liquid crystal display panel except that the panel 512 does not include display electrodes nor polarizing plates.

In the above 10th and 11th embodiments, display images on the two liquid crystal panels 503a and 503b are projected on the screen S by the independent projection lenses 502a and 502b, respectively, so that the images are superposed on the screen S. The display images on the panels 503a and 503b, however, may be superposed before they are incident on the projection lenses, and may then be projected on the screen S. The 12th embodiment having this arrangement will be described below with reference to FIG. 19. The 12th embodiment comprises a light synthesizing beam splitter 513 arranged before a first liquid crystal display panel 503a, and a mirror 514 for reflecting light transmitted through a second liquid crystal display panel 503b toward the beam splitter 513. Display images on the panels 503a and 503b are superposed by the beam splitter 513 and then projected on a screen surface by a projection lens 502 via a condenser lens 506. In this arrangement, an image obtained by superposing the display images on the two panels 503a and 503b can be similarly projected on the screen surface. In addition, according to this embodiment, only one projection lens 502 and only one condenser lens 506 are required. Note that in FIG. 19, an optical system for causing light to be incident on the liquid crystal display panels 503a and 503b has the same arrangement as that of the 11th embodiment. This optical system, however, may have the same arrangement as that of the 10th embodiment. The light synthesizing beam splitter 513 is obtained by bonding two right triangular prisms 513a and 513b having the same optic axial direction. Light incident on the first prism 513a is directly transmitted to the second prism 513b, and light incident on the second prism 513b is reflected from a bonding surface between the two prisms 513a and 513b in a direction perpendicular to an incident direction.

Figure 19:
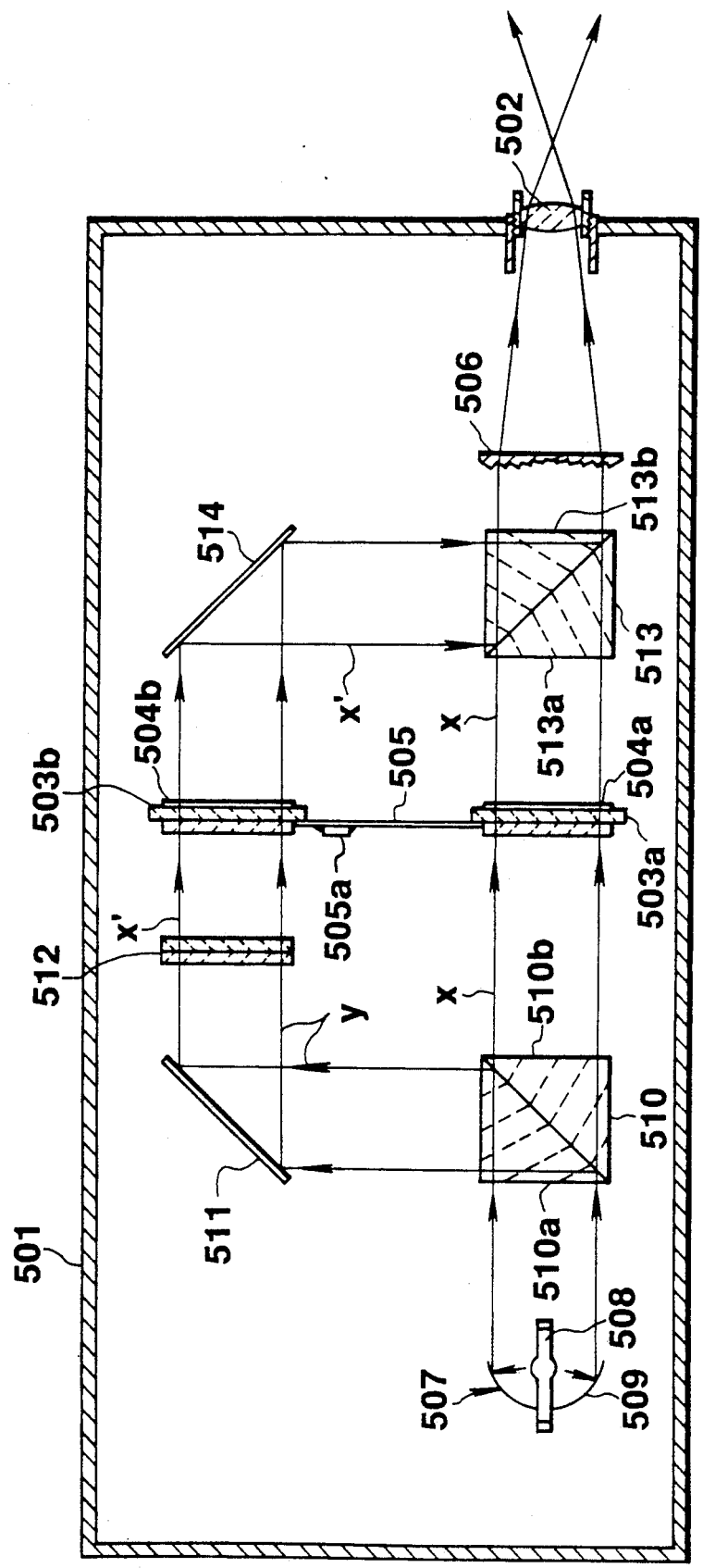
FIG. 19 is a cross-sectional view of a projector liquid crystal display apparatus according to a 12th embodiment of the present invention.

In the above 10th to 12th embodiments, the polarizing beam splitter 510 is used as a light splitting element for splitting light from the light source 507 into ordinary light rays and extraordinary light rays. The light splitting element, however, is not limited to the polarizing beam splitter. Similarly, the optical rotatory element (TN liquid crystal display panel 512) in the 11th embodiment and the light synthesizing element (light synthesizing beam splitter 513) in the 12th embodiment are not limited to the TN liquid crystal display panel and the beam splitter, respectively. In FIGS. 17, 18 and 19, the polarizing plates 504a and 504b are provided at only the light output sides of the liquid crystal display panels 503a and 503b, respectively. If, however, polarizing plates are provided at light incident sides of the panels 503a and 503b, incident light is not absorbed by the polarizing plates at the light incident sides but transmitted therethrough since the incident light on the panels 503a and 503b consists of only light (extraordinary or ordinary light rays) in an oscillation direction to be used in display. Therefore, the panels 503a and 503b may include polarizing plates at their both sides. In the above embodiments, the projector liquid crystal display apparatus for projecting display images on the panels 503a and 503b onto the external screen has been described. The present invention, however, can be applied to a projector liquid crystal display apparatus in which a transmission screen is provided on the front surface of the apparatus and a display image on a liquid crystal display panel is projected on this screen.

The projector liquid crystal display apparatus of this embodiment comprises: two transmission liquid crystal display panels for displaying the same image or images; a projection lens for projecting display images on the two liquid crystal display panels on a screen surface, thereby displaying an image obtained by superposing the two images on the screen surface; a light source for emitting light to be incident on the two liquid crystal display panels; and an optical system for splitting light from the light source into ordinary light rays and extraordinary light rays having different oscillation directions by a light splitting element, causing one of the light rays to be incident on a corresponding one of the liquid crystal display panels, and causing the other light rays to be incident on the other liquid crystal display panel. Therefore, light from the light source can be utilized without waste light to project an image with high luminance on the screen surface, and a temperature rise on the liquid crystal panel can be prevented.

The 13th embodiment of the present invention will be described below with reference to FIGS. 20 to 23.

Figure 20:
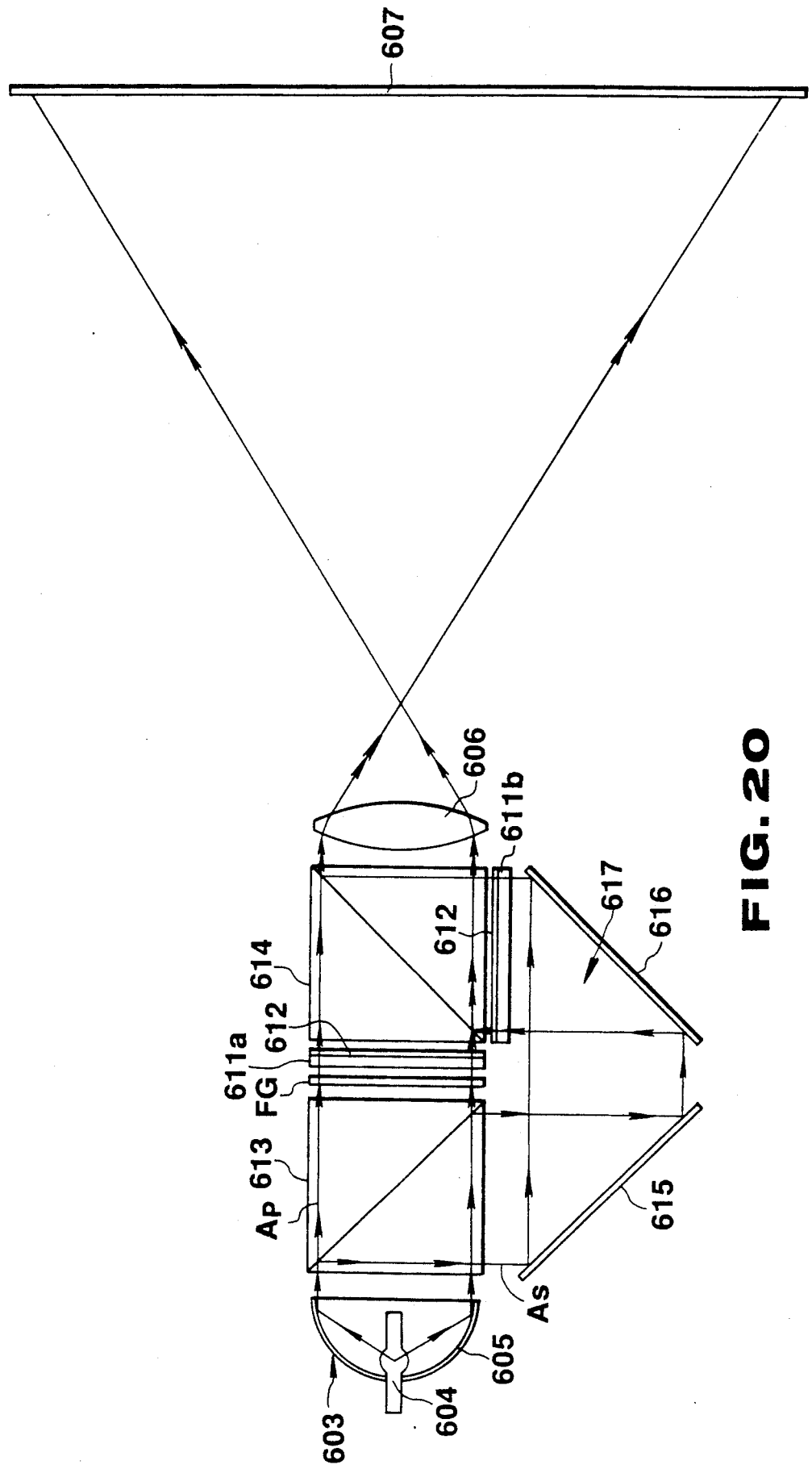
FIG. 20 is a side view of a projector liquid crystal display apparatus according to a 13th embodiment of the present invention.
Figure 21:
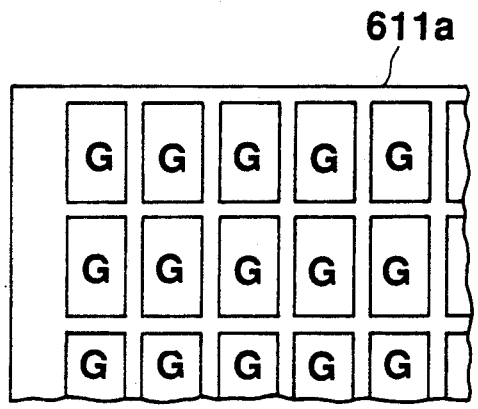
FIGS. 21 and 22 are views each showing a pixel arrangement of an image displayed by each liquid crystal display panel of the 13th embodiment.
Figure 22:
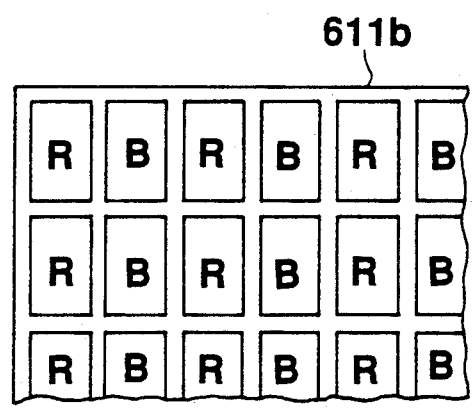

Referring to FIG. 20, reference numeral 603 denotes a light source including a light source lamp 604 and a paraboloidal reflector 605; 606, a projection lens; and 607, a screen. These parts are the same as those of the conventional projector liquid crystal display apparatus shown in FIG. 1. Reference numerals 611a and 611b denote TN liquid crystal display panels. As shown in FIG. 21, the panel 611a is a green image display panel for displaying only green pixels G. As shown in FIG. 22, the panel 611b is a red/blue image display panel for alternately displaying red and blue pixels R and B. Note that the panel 611a has a green filter FG having the same area as the panel 611a on its light-incident or light-output surface. In the panel 611b, red and blue filters are alternately arranged in correspondence with pixel display electrodes. The panel 611a performs display by using P-polarized light (linearly polarized light having an oscillation direction parallel to the drawing surface). The panel 611b performs display by using S-polarized light (linearly polarized light having an oscillation direction perpendicular to the drawing surface).

The panel 611a for performing display by using the P-polarized light is arranged to oppose the light source 603. A light splitting polarizing beam splitter 613 is arranged between the panel 611a and the light source 603. The beam splitter 613 splits radiation light A from the light source 603 into P-polarized light Ap and S-polarized light As. Of the radiation light A from the light source 603, the beam splitter 613 directly transmits the light Ap to be incident on the panel 611a and reflects the light As toward a splitter side surface. An image synthesizing polarizing beams splitter 614 is arranged between the panel 611a and the projection lens 606. The beam splitter 614 transmits the light Ap transmitted through the panel 611a so as to be incident on the lens 606, and reflects the light As incident from the splitter side surface toward the lens 606. The light As split by the beam splitter 613 and output from its side surface is incident on the beam splitter 614 from its side surface via an S-polarized light optical path 617 obtained by arranging mirrors 615 and 616 to obliquely oppose the side surfaces of the beam splitters 613 and 614, respectively, at an angle of 45 degrees.

The panel 616b for performing display by using the S-polarized light is arranged in the optical path 617 so as to oppose the side surface of the beam splitter 614.

Figure 23:
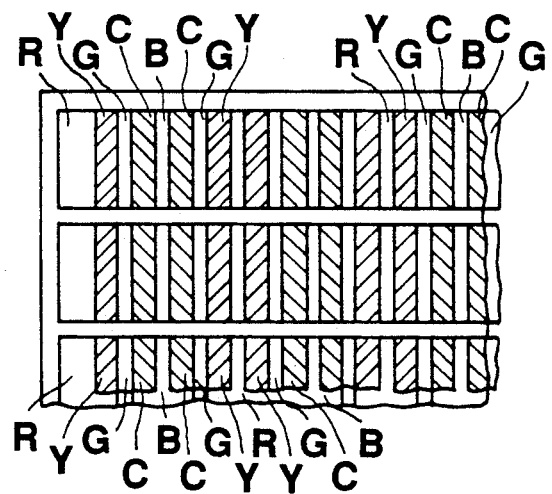
FIG. 23 is a view of a pixel arrangement of a full-color image synthesized in the 13th embodiment.

In this projector liquid crystal display apparatus, the beam splitter 613 splits the radiation light A from the light source 603 into the P-polarized light Ap and the S-polarized light As; the light Ap from the beam splitter 613 is incident on the panel 611a for performing display by using P-polarized light; the light As from the beam splitter 613 is incident on the panel 611b for performing display by using S-polarized light via the optical path 617; and the transmission light from the panel 611a and the transmission light from the panel 611b are synthesized by the beam splitter 614 and incident on the lens 606. Of the two liquid crystal display panels 611a and 611b, the panel 611a displays an image of green of three primary colors, and the other panel 611b displays an image of red and blue. Therefore, an image obtained by synthesizing the light components transmitted through the panels 611a and 611b is a full-color image. This full-color image is enlarged and projected on a screen 607 by the projection lens 606. As shown in FIG. 23, a display image on the panel 611a and that on the panel 611b are synthesized such that the green pixel G is positioned between the red and blue pixels R and B. In the full-color image synthesized in this manner, the primary color pixels, i.e., red, green, and blue pixels R, G, and B, a yellow pixel Y as a synthetic color of red and green, and a cyan pixel C as a synthetic color of green and blue are arranged in the order of R, Y, G, C, B, C, G, Y, . . . , as shown in FIG. 23. In this projector liquid crystal display apparatus, the beam splitter 613 splits the radiation light A from the light source 603 into the P-polarized light Ap and the S-polarized light As; and the light Ap is incident on the panel 611a, and the light As is incident on the other panel 611b. For this reason, a light amount incident on each of the panels 611a and 611b is substantially half that of a radiation light amount from the light source 603. The panel 611a, however, on which the P-polarized light Ap is incident performs display by using P-polarized light, and the panel 611a on which the S-polarized light As is incident performs display by using S-polarized light. Therefore, all of the light incident on the panels 611a and 611b can be used in display on the panels 611a and 611b. As a result, the radiation light A from the light source 603 can be utilized in display on the liquid crystal display panels with almost no waste light. In addition, the luminance of the full-color image obtained by synthesizing the display images on the two panels 611a and 611b has a total value of luminance values of the two images. Therefore, a full-color image with high luminance and high contrast can be projected on the screen 607. Note that in the above projector liquid crystal display apparatus, the radiation light A from the light source 603 is split into the P-polarized light Ap and the S-polarized light As and then incident on the panels 611a and 611b, respectively. Therefore, since the light incident on each of the panels 611a and 611b is linearly polarized light, no polarizing plate for converting incident light into linearly polarized light is located at the light-incident surface side of each of the panels 611a and 611b. That is, as shown in FIG. 20, each of the panels 611a and 611b need only have a polarizing plate 612 at its light output side.

In the above embodiment, the red/blue image displaying liquid crystal display panel 611b for performing display by using S-polarized light is arranged to oppose the side surface of the image synthesizing polarizing beam splitter 614. The panel 611b for performing display by using the S-polarized light, however, can be located at an position in the S-polarized light optical path 617. In the above embodiment, the liquid crystal display panel 611a for performing display by using P-polarized light displays a green image, and the liquid crystal panel 611b for performing display by using the S-polarized light displays a red/blue image. The present invention, however, is not limited to this arrangement. For example, a liquid crystal display panel for performing display by using the S-polarized light may display an image of one of the three primary colors, red, green, and blue, while a liquid crystal display panel for performing display by using the P-polarized light displays an image of the other two colors.

The projector liquid crystal display apparatus of this embodiment comprises two liquid crystal display panels, i.e., a liquid crystal display panel for displaying an image on one of the three primary colors, red, green, and blue; and a liquid crystal display panel for displaying an image of the other two colors. One liquid crystal display panel performs display by using P-polarized light. The other liquid crystal display panel performs display by using S-polarized light. One of the liquid crystal display panels is arranged to oppose the light source, and a polarizing beam splitter is arranged between this liquid crystal display panel and the light source. Of radiation light from the light source, the beam splitter transmits the P-polarized light to be incident on the liquid crystal display panel and reflects the S-polarized light toward the side surface. An image synthesizing polarizing beam splitter is arranged between the liquid crystal display panel and the projection lens. This beam splitter transmits the P-polarized light transmitted through the liquid crystal display panel so as to be incident on the projection lens and reflects the S-polarized light incident from the side surface toward the projection lens. Mirrors are arranged to obliquely oppose the side surfaces of the light splitting polarizing beam splitter and the image synthesizing polarizing beam splitter. These mirrors constitute an S-polarized light optical path for causing the S-polarized light output from the light splitting polarizing beam splitter to be incident on the image synthesizing polarizing beam splitter from its side surface. The other liquid crystal display panel is arranged in this S-polarized optical path. Therefore, since the radiation light from the light source can be utilized in display on the liquid crystal display panels with almost no waste light, a full-color image with high luminance and high contrast can be projected on a screen.

The 14th embodiment of the present invention will be described below with reference to FIGS. 24 to 30.

Figure 24:
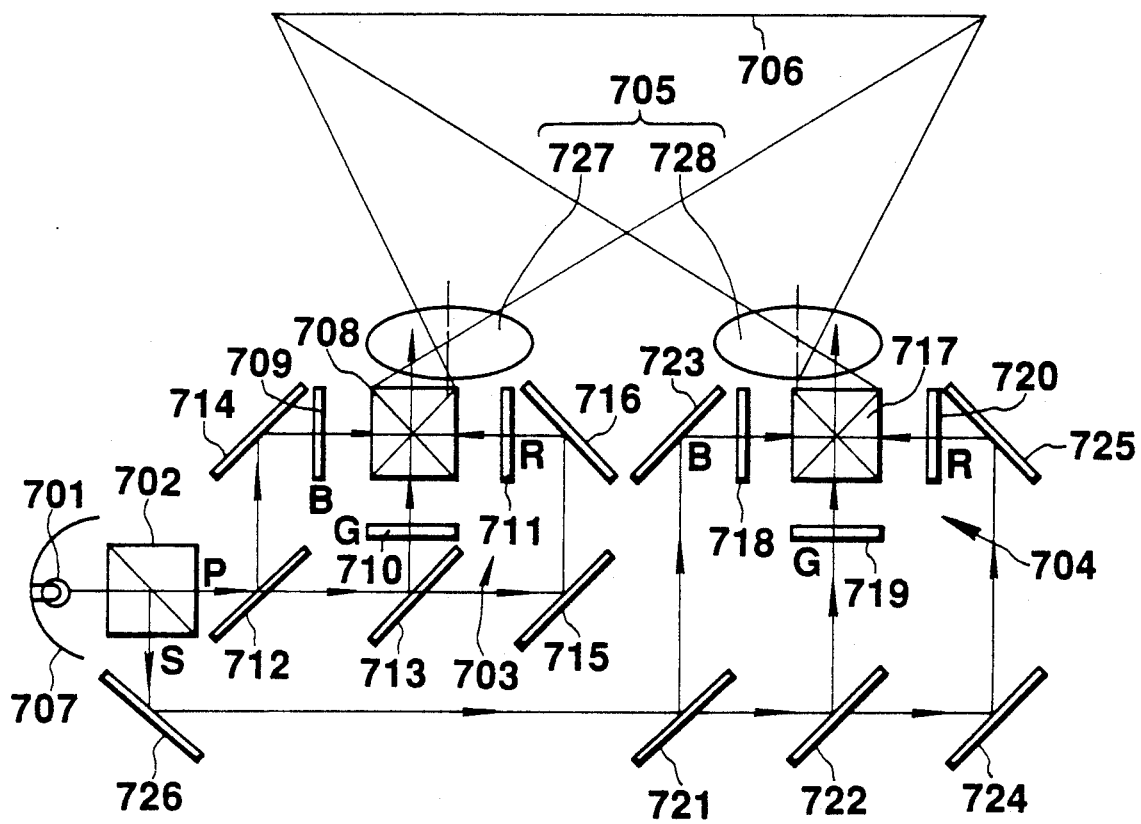
FIG. 24 is a schematic view of a liquid crystal projector apparatus according to a 14th embodiment of the present invention.

FIG. 24 shows a schematic arrangement of a liquid crystal projector. In this liquid crystal projector, light from a light source 701 is split into P- and S-polarized light components by a polarizing beam splitter 702. Light rays having the P-polarized light component are radiated on an image generator 703 for P-polarized light, and light rays having the S-polarized light component are radiated on an image generator 704 for S-polarized light. Display images of the image generators 703 and 704 are synthesized and projected on a screen 706 by a projecting unit 705.

The light source 701 for generating light comprises a xenon lamp or the like and has a reflector 707 at its back side. The reflector 707 radiates light from the light source 701 forward as colimated light. This collimated light has two linearly polarized light components oscillating in directions perpendicular to each other in a plane perpendicular to a propagation direction of the light rays, i.e., P- and S-polarized light components.

The beam splitter 702 splits the collimated light rays from the light source 701 and the reflector 707 into P- and S-polarized light components. The beam splitter 702 transmits light ray having the P-polarized light component in the same direction as the light rays from the light source 701, and reflects light rays having the S-polarized light component in a direction perpendicular to the above direction.

The image generators 703 and 704 generate color images and have the same arrangement. That is, the image generator 703 generates a color image by using light rays having the P-polarized light component and includes liquid crystal display panels 709 to 711 of three colors, blue, green, and red, respectively, near a dichroic prism 708. The light rays having the P-polarized light component transmitted through the beam splitter 702 are split into the three colors and radiated by dichroic mirrors 712 and 713 and total-reflecting mirrors 714 to 716 on the panels 709 to 711. For example, of the light rays having the P-polarized light component transmitted through the beam splitter 702, only light rays having a blue wavelength are reflected by the dichroic mirror 712, and this reflected light is reflected by the total-reflecting mirror 714 and radiated on the liquid crystal display panel 709 for blue. Of the light rays having the P-polarized light component transmitted through the dichroic mirror 712, only light rays having a green wavelength are reflected by the next dichroic mirror 713, and this reflected light is radiated on the liquid crystal display panel 710 for green. Of the light rays having the P-polarized light component, only light rays having a red wavelength are transmitted through the dichroic mirror 710, reflected by the total-reflecting mirrors 715 and 716, and radiated on the liquid crystal display panel 711 for red. The panels 709 to 711 electro-optically display images corresponding to the three colors, blue, green, and red, respectively. When the light rays of the respective colors are radiated on the panels 709 to 711, the dichroic prism 708 synthesizes the displayed images into a color image. Similar to the image generator 703, the image generator 704 on which light rays having the S-polarized light component are radiated is constituted by a dichroic prism 717, liquid crystal display panels 718 to 720 for three colors, dichroic mirrors 721 and 722, and total-reflecting mirrors 723 to 725. A total-reflecting mirror 726 is arranged near the beam splitter 702 and reflects the light rays having the S-polarized light component reflected at 90 degrees by the beam splitter 702 in a direction parallel to the light rays having the P-polarized light component toward the image generator 704.

Figure 25:
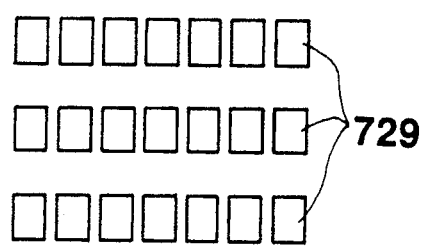
FIGS. 25, 26, and 27 are views each showing a pixel arrangement of a projected image in the 14th embodiment.
Figure 26:
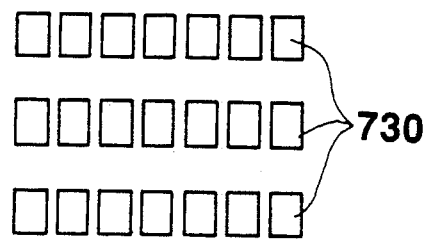
Figure 27:
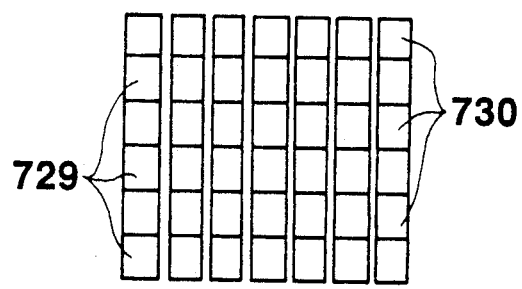

The projecting unit 705 synthesizes and projects color images generated by the generators 703 and 704 on the screen 706 in an enlarged scale. The projecting unit 705 includes two projection lenses 727 and 728. The lens 727 is located before and close to the dichroic prism 708 of the image generator 703 for P-polarized light such that its optical axis is slightly offset from an optical axis of the prism 708 to the right side of the drawing surface. Therefore, a color image generated by the P-polarized light image generator 703 is shifted to the right and projected in an enlarged scale on the screen 706 as shown in FIG. 25. The lens 728 is located before and close to the dichroic prism 717 of the image generator 704 for S-polarized light such that its optical axis is offset from an optical axis of the prism 717 to the left side of the drawing surface. Therefore, a color image generated by the S-polarized light image generator 704 is shifted to the right and projected in an enlarged scale on the screen 706 as shown in FIG. 26. When the display color images of the generators 703 and 704 are to be projected on the screen 706, rows of pixels 729 of the color image generated by the generator 703 and rows of pixels 730 of the color image generated by the generator 704 are vertically offset from each other by one pitch and alternately synthesized in units of rows as shown in FIG. 27 so that the pixels 729 and 730 do not overlap each other.

According to the liquid crystal projector having the above arrangement, light from the light source 701 is split into P- and S-polarized light components by the polarizing beam splitter 702; light rays having the split polarized light components are radiated on the image generators 703 and 704; images of the respective colors displayed on the liquid crystal display panels 709 to 711 and 718 to 720 of the generators 703 and 704 are synthesized into color images by the dichroic prisms 708 and 717, respectively; and these color images are synthesized and projected in an enlarged scale on the screen 706 by the projection lenses 727 and 728 of the projecting unit 705. Upon projection, the rows of pixels 729 of the image projected by the light rays having the P-polarized light component and the rows of pixels 730 of the image projected by the light rays having the S-polarized light component are vertically offset from each other by one pitch and alternately synthesized in units of rows as shown in FIGS. 25 to 27 so that the pixels 729 and 730 do not overlap each other. Therefore, although brightness and resolution of the image projected on the screen 706 are the same as those obtained by a conventional apparatus, its duty ratio is increased. As a result, contrast is improved to realize a clear projected image.

In this embodiment, the rows of pixels 729 of the image projected by the light ray having the P-polarized light component and the rows of pixels 730 are vertically offset from each other by one pitch and alternately synthesized in units of rows so that the pixels 729 and 730 do not overlap each other. The present invention, however, is not limited to this arrangement. For example, as shown in FIG. 27, the pixels 729 of the image projected by the light rays having the P-polarized light component and the pixels 730 of the image projected by the light rays having the S-polarized light component may overlap each other. In this case, although the duty ratio is the same as that obtained by the conventional apparatus and the contrast is not improved, the brightness and resolution can be doubled. Therefore, a clear projected image can be obtained.

Figure 28:
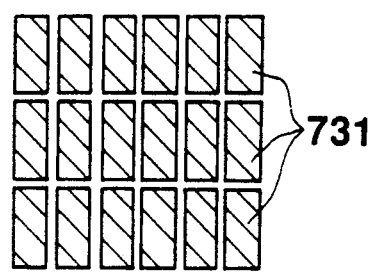
FIGS. 28, 29, and 30 are views each showing another pixel arrangement of a projected image in the 14th embodiment.
Figure 29:
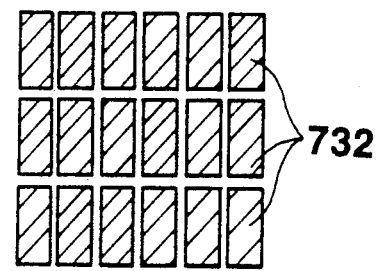
Figure 30:
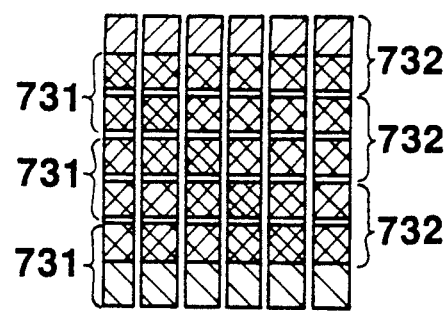

In addition, as shown in FIGS. 28 to 30, pixels 731 of an image projected by light rays having the P-polarized light component and pixels 732 of an image projected by light rays having the S-polarized light components may be arranged in matrices, respectively, vertically offset from each other by a ½ pitch, and synthesized and projected so that the pixels 731 and 732 overlap each other half-and-half. In this arrangement, the brightness can be increased to twice that obtained by the conventional arrangement, and the duty ratio can be increased. As a result, the contrast is improved to realize a very clear projected image.

As described above, according to the projector apparatus of this embodiment, light generated from a single light source is split into two light rays having P- and S-polarized light components, respectively, by splitting element, the two light rays are radiated on a plurality of liquid crystal image generators, and images generated by the plurality of image generators are synthesized and projected by a projecting unit. Therefore, since the brightness or contrast can be improved, a clear image can be obtained.

The 15th embodiment of the present invention will be described below with reference to FIGS. 31 to 34.

Figure 31:
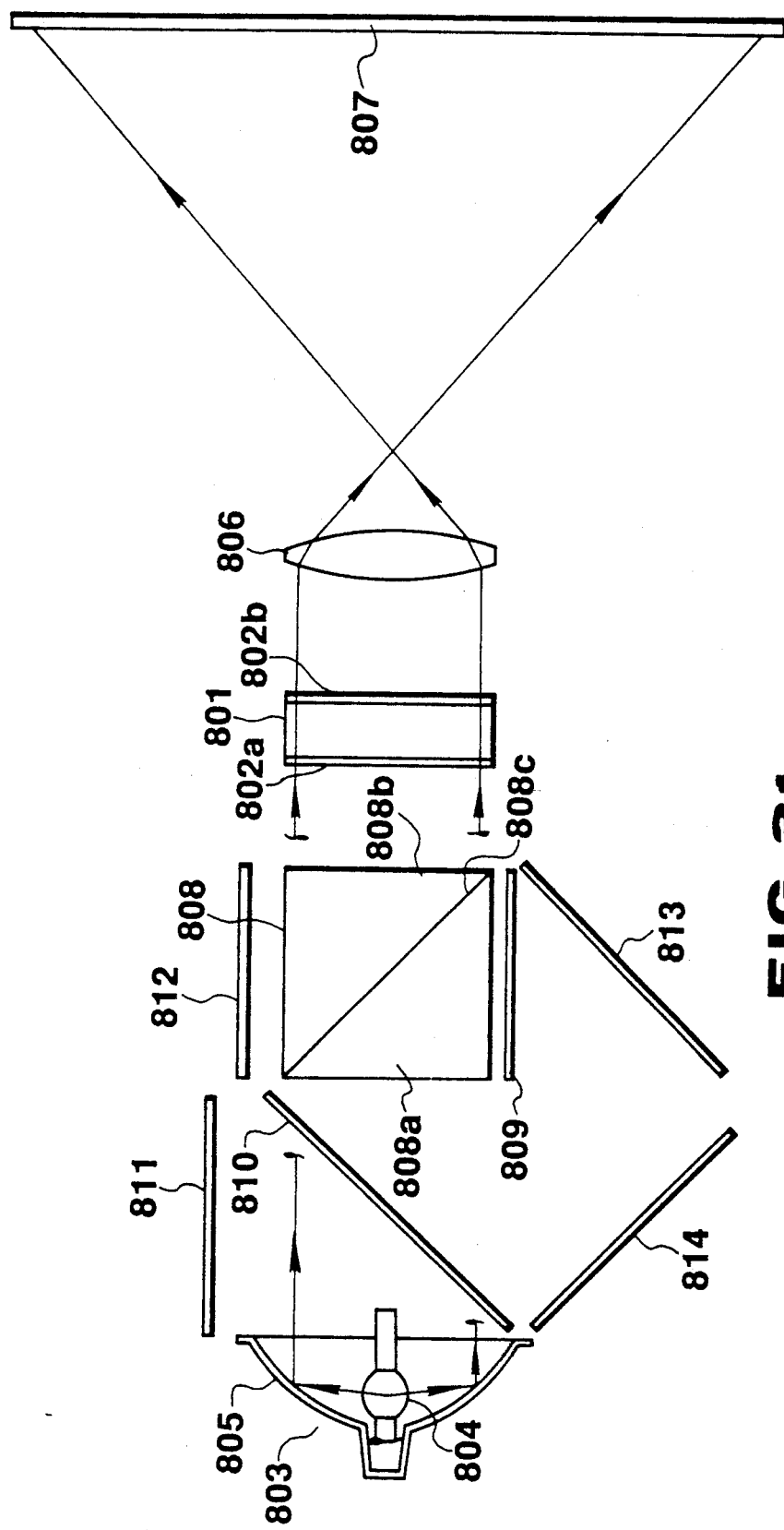
FIG. 31 is a schematic view of a projector liquid crystal display apparatus according to a 15th embodiment of the present invention.

FIG. 31 shows an arrangement of a projector liquid crystal display apparatus according to the 15th embodiment of the present invention. Referring to FIG. 31, reference numeral 801 denotes a TN liquid crystal display panel having polarizing plates 802a and 802b at its light incident and output sides, respectively; 803, a light source including a light source lamp 804 and a paraboloidal reflector 805; 806, a projection lens; and 807, a screen. These parts are the same as those in the conventional projector liquid crystal display apparatus.

Reference numeral 808 denotes a polarizing beam splitter for splitting light from the light source 803 into P-polarized light and S-polarized light. The beam splitter 808 is arranged between the light source 803 and the liquid crystal panel 801. The beam splitter 808 is obtained by combining prisms 808a and 808b. The P-polarized light is transmitted through a beam splitter surface 808c (boundary surface between the prisms 808a and 808b) and incident on the panel 801, and the S-polarized light is reflected by the surface 808c in a direction substantially perpendicular to a transmission direction.

Reference numeral 809 denotes a halfwave plate for converting the S-polarized light reflected by the beam splitter 808 into the P-polarized light; and 810, a half mirror arranged between the beam splitter 808 and the light source 803. The half mirror 810 splits the light from the light source 803 into transmission light and reflection light. A first mirror 811 is arranged in a reflection direction of the half mirror 810 so as to be substantially perpendicular to an optical axis of the reflected light from the half mirror 810. Reference numeral 812 denotes a second mirror arranged at the side of the beam splitter 808 opposite to the halfwave plate 809; 813, a third mirror for reflecting the P-polarized light from the plate 809 toward the light source 803; and 814, a fourth mirror for reflecting the reflected light from the third mirror 813 toward the half mirror 810.

Figure 32:
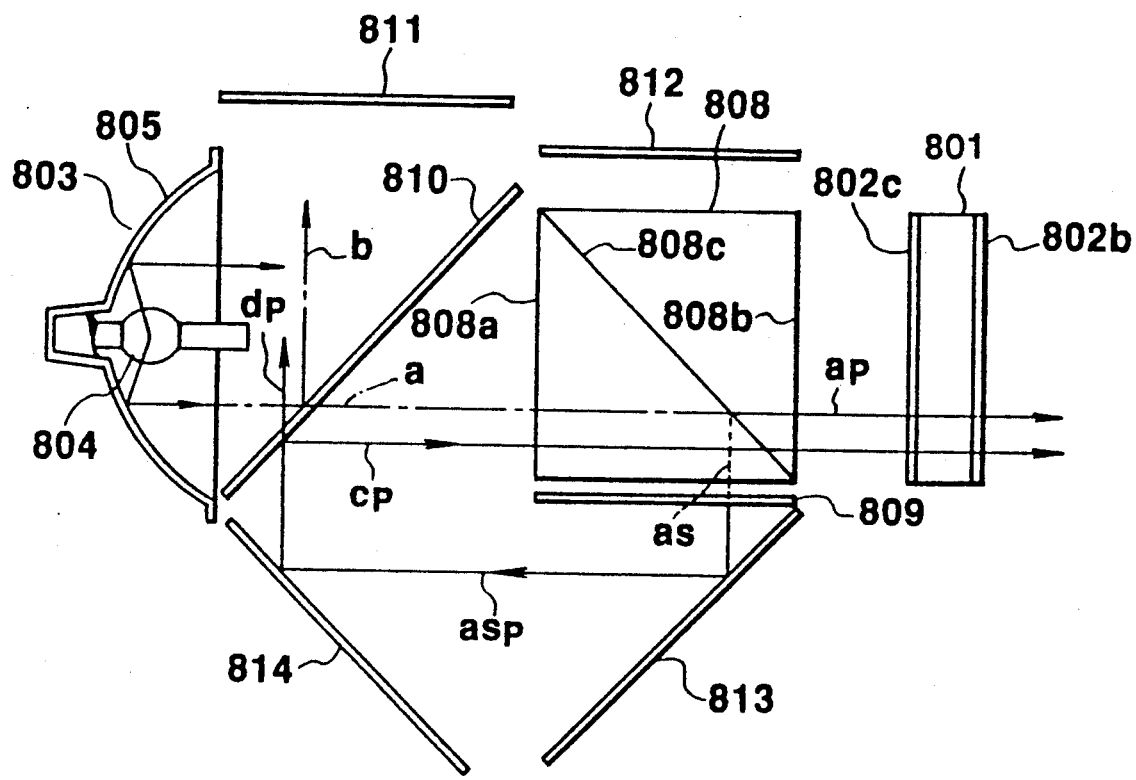
FIGS. 32, 33, and 34 are views each showing an operation of the 15th embodiment.

An operation of the projector liquid crystal display apparatus having the above arrangement will be described below with reference to FIGS. 32 to 34. Note that in each of FIGS. 32 to 34, an alternate long and short dashed line indicates natural light from the light source 803, a solid line indicates P-polarized light, and a broken line indicates S-polarized light. As shown in FIG. 32, radiation light (natural light) from the lamp 80 is reflected by the reflector 805 and incident on the half mirror 810 as light parallel to a reflector optical axis. The light from the light source 803 incident on the half mirror 810 is split into transmission light a and reflection light b. The transmission light a is incident on the beam splitter 808. The light a incident on the beam splitter 808 is split into P-polarized light $a_p$ and S-polarized light $a_s$. The P-polarized light $a_p$ is transmitted through the surface 808c and incident on the panel 801.

The S-polarized light $a_s$ is reflected by the surface 808c, incident on the halfwave plate 809, and converted into P-polarized light $a_{sp}$ by the plate 809. The P-polarized light $a_{sp}$ converted from the S- to P-polarized light by the plate 809 is reflected by the third and fourth mirrors 813 and 814 and incident on the half mirror 810. The light $a_{sp}$ incident on the half mirror 810 is split into reflection light $c_p$ and transmission light $d_p$. The reflection light $c_p$ is incident on the beam splitter 808 again, transmitted through the surface 808c, and incident on the panel 801.

Figure 33:
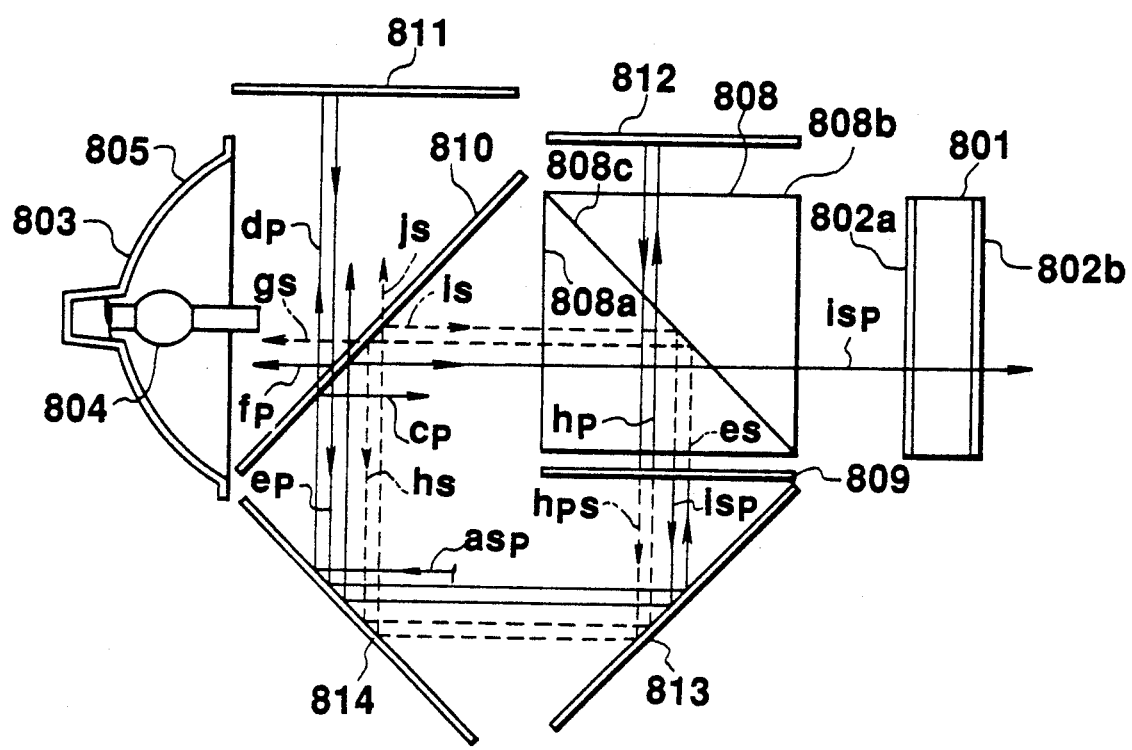

The transmission light $d_p$ is reflected by the first mirror 811 and incident on the half mirror 810 again, as shown in FIG. 33. The light $d_p$ incident on the half mirror 810 is split into transmission light $e_p$ and reflection light $f_p$. The transmission light $e_p$ is reflected by the fourth and third mirrors 814 and 813 and incident on the plate 809. The reflection light $f_p$ is reflected toward the light source 803, reflected by the reflector 805, and incident together with random light on the half mirror 810 again.

The light $e_p$ from the half mirror 810 incident on the plate 809 is converted into S-polarized light $e_s$ by the plate 809 and incident on the beam splitter 808. The light $e_s$ incident on the beam splitter 808 is reflected by the surface 808c toward the light source 803 and incident on the half mirror 810. The light $e_s$ incident on the half mirror 810 is split into transmission light $G_s$ and reflection light $h_s$. The transmission light $g_s$ is returned to the light source 803, reflected by the reflector 805, and incident together with random light on the half mirror 810 again. The reflection light $h_s$ is reflected by the fourth and third mirrors 814 and 813 and incident on the plate 809 The light $h_p$ incident on the plate 809 is converted into P-polarized light $h_p$ and incident on the beam splitter 808. The light $h_p$ incident on the beam splitter 808 is transmitted through the surface 808c, reflected by the second mirror 812, and incident on the beam splitter 808 again. The light $h_p$ is transmitted through the surface 808c, incident on the plate 809, and converted into S-polarized light $h_{ps}$. The light $h_{ps}$ converted from P- into S-polarized light by the plate 809 is reflected by the third and fourth mirrors 813 and 814, and incident on the half mirror 810. The light $h_{ps}$ incident on the half mirror 810 is split into reflection light $i_s$ and transmission light $j_s$. The reflection light $i_s$ is incident on the beam splitter 808 is reflected by the surface 808c, incident on the plate 809, and converted into P-polarized light $i_{sp}$ by the plate 809. The light $i_{sp}$ is incident on the panel 801 through an optical path similar to that of the P-polarized light $i_{sp}$ described above. Note that the transmission light $j_s$ is incident on the panel 801 through an optical path similar to that of the S-polarized light $a_s$ described above.

Figure 34:
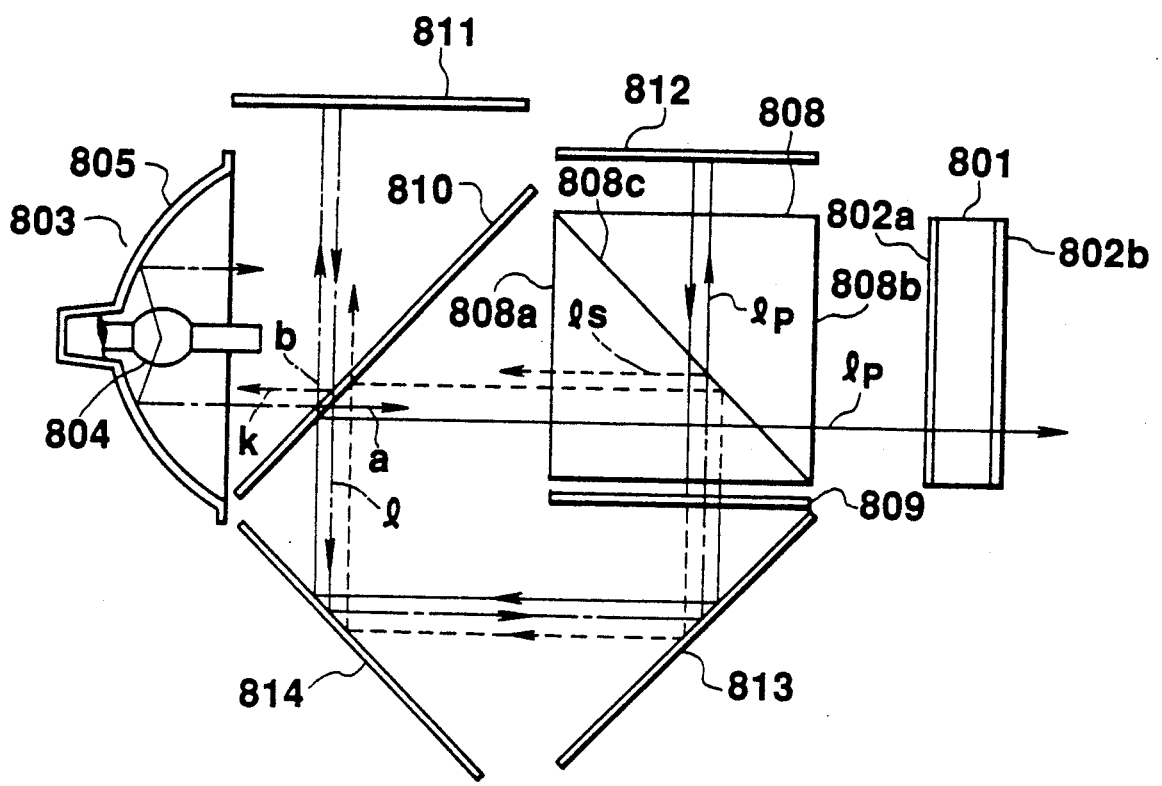

The natural light b reflected by the half mirror 810 is reflected by the first mirror 811 as shown in FIG. 34, and incident on the half mirror 810 again. The natural light b incident from the first mirror 811 on the half mirror 810 is split into reflection light k and transmission light l. The reflection light k is returned to the light source 803 and incident on the half mirror 810 again together with the natural light from the light source 803. The transmission light l is reflected by the fourth and third mirrors 814 and 813 and incident on the beam splitter 808 through the plate 809. The light l incident from the half mirror 810 on the beam splitter 808 is split into P-polarized light $l_p$ and S-polarized light $l_s$. The S-polarized light $l_s$ is incident on the panel 801 through an optical path similar to the S-polarized light $e_s$ described above. The P-polarized light $l_p$ is incident on the panel 801 through an optical path similar to that of the P-polarized light $h_p$ described above.

In this embodiment, therefore, since almost 100% of the light from the light source 803 can be incident on the liquid crystal display panel 801, a bright image with high contrast can be obtained as a display image on the panel 801 to be projected on the screen 807.

The present invention is not limited to the 15th embodiment. For example, in the 15th embodiment, the halfwave plate 809 is used as a means for converting S-polarized light into P-polarized light. Two quarterwave plates, however, may be used to convert the S-polarized light into the P-polarized light. Alternatively, in place of the halfwave plate 809, a liquid crystal panel in which liquid crystal molecules are twisted substantially 90 degrees may be used. In addition, since the light incident on the liquid crystal display panel 801 is linearly polarized light having the same oscillation direction, the panel 801 can perform display without providing the polarizing plate 802a at the light incident surface of the panel 801.

As described above, the 15th embodiment of the present invention comprises: a polarizing beam splitter, arranged between a light source and a liquid crystal display panel, for splitting light from the light source into P-polarized light and S-polarized light, transmitting the P-polarized light in an incident direction of the liquid crystal display panel, and reflecting the S-polarized light; an optical rotatory element for converting the S-polarized light into the P-polarized light; a half mirror arranged between the polarizing beam splitter and the light source; a first mirror arranged in a reflection direction of the half mirror; a second mirror arranged at the side of the polarizing beam splitter opposite to the optical rotatory element; a third mirror for reflecting the light converted into the P-polarized light by the optical rotatory element toward the light source; and a fourth mirror for reflecting the reflection light from the third mirror toward the half mirror. According to the 15th embodiment, therefore, since all the light from the light source is converted into the P-polarized light and incident on the liquid crystal display panel, almost 100% of the light from the light source can be incident on the liquid crystal display panel. As a result, a liquid crystal display apparatus capable of displaying an image with high luminance and high contrast on the liquid crystal display panel can be provided.

What is claimed is:

1. A liquid crystal display apparatus, comprising:
   a first liquid crystal panel;
   a second liquid crystal panel;
   a light source;
   a projecting lens;
   splitting means for splitting light emitted from said light source into two light beams; and
   optical means having transmission surfaces and reflection surfaces, for guiding the light beams from said splitting means to said projecting lens, said optical means including means for causing one of the light beams to be incident upon said projecting lens through substantially only said transmission surfaces and said first liquid crystal display panel, and means for causing other light beam to be incident upon said projecting lens through substantially only said reflection surfaces and said second liquid crystal display panel.

2. An apparatus according to claim 1 wherein said splitting means splits the light emitted from said light source into S-polarized light and P-polarized light.

3. An apparatus according to claim 1 wherein one of said two light beams, which passes through only said transmission surfaces, is P-polarized light, and other light beam, which passes through only said reflection surfaces, is S-polarized light.

4. An apparatus according to claim 1, wherein said first liquid crystal display panel displays an image of one of three primary colors, and said second liquid crystal display panel displays an image of other two colors.

5. A liquid crystal display apparatus, comprising:
   a light source;
   a projecting lens;
   a first liquid crystal display means, opposite to said light source, for displaying an image;
   a polarizing beam splitter arranged between said light source and said first liquid crystal display means, for splitting light emitted from said light source into P-polarized light and S-polarized light and for causing the P-polarized light to be incident upon said first liquid crystal display means and the S-polarized light to be reflected to the side of said polarizing beam splitter;
   image synthesizing means arranged between said first liquid crystal display means and said projecting lens, for synthesizing the P-polarized light entered through said first liquid crystal display means and the S-polarized light entered from the side of said image synthesizing means, and for emitting the synthesized light to said projecting lens;
   two mirror means arranged between the side of said polarizing beam splitter and the side of said image synthesizing means, for reflecting the S-polarized light reflected by said polarizing beam splitter and for further reflecting the reflected S-polarized light to form a light path through which the S-polarized light is incident upon said image synthesizing means; and
   second liquid crystal display means arranged in said light path for displaying an image.

6. An apparatus according to claim 5, wherein said first liquid crystal display means displays an image of at least one of three primary colors, and said second liquid crystal display means displays an image of at least one of other two colors.

7. A liquid crystal display apparatus, comprising:
   liquid crystal display means for displaying an image;
   a light source;
   a half mirror for splitting light emitted from said light source into transmission light and reflection light;
   splitter means for splitting the light transmitted through said half mirror into two light beams; and
   optical means for causing one of the light beams obtained by said splitter means to be incident upon said liquid crystal display means and the other light beam to be incident upon said liquid crystal display means through said half mirror, and for causing the light reflected by said half mirror to be incident upon said liquid crystal display means.

8. An apparatus according to claim 7, wherein said splitter means includes means for splitting the light emitted from said light source into S-polarized light and P-polarized light.

9. An apparatus according to claim 7, wherein:
   said splitter means includes means for splitting the light emitted from said light source into S-polarized light and P-polarized light; and
   said optical means includes means for causing the P-polarized light to be directly incident upon said liquid crystal display means.

10. An apparatus according to claim 7, wherein:
    said splitter means includes means for splitting the light emitted from said light source into S-polarized light and P-polarized light; and
    said optical means includes means for causing the P-polarized light to be directly incident upon said liquid crystal display means; and
    wherein said apparatus further comprises converting means for converting the S-polarized light into P-polarized light.

11. An apparatus according to claim 7, wherein said optical means includes a plurality of mirrors.

12. An apparatus according to claim 7, wherein said optical means includes means for causing the light split by said splitting means and transmitted through said half mirror to be incident upon said liquid crystal display means through said splitter means again.

13. A liquid crystal display apparatus for causing light emitted from a light source to be incident upon a liquid crystal display panel and displaying an image on the liquid crystal display panel, comprising:

a polarizing beam splitter arranged between said light source and said liquid crystal display panel, for splitting the light emitted from said light source into P-polarized light and S-polarized light and to transmit the P-polarized light in an incident direction of said liquid crystal display panel and to reflect the S-polarized light;

an optical rotatory means arranged for converting the S-polarized light reflected by said polarizing beam splitter into P-polarized light;

a half mirror arranged between said polarizing beam splitter and said light source;

a first mirror arranged in a reflection direction of said half mirror;

a second mirror arranged opposite to said optical rotatory means, with said polarizing beam splitter interposed therebetween;

a third mirror for reflecting the light which is converted into the P-polarized light by said optical rotatory means in a direction of said light source; and a fourth mirror for reflecting the light reflected by said third mirror in a direction of said half mirror.

14. A liquid crystal display apparatus, comprising:
a light source having a reflector;
liquid crystal display means for displaying an image;
splitter means arranged between said light sources and said liquid crystal display means, for splitting light emitted from said light source into P-polarized light and S-polarized light and to transmit the P-polarized light and reflect the S-polarized light in a direction of said light source; and
optical rotatory means arranged between said splitter means and said light source, for optically rotating the transmitted light approximately 45 degrees.

15. A liquid crystal display apparatus, comprising:
a light source having a reflector;
a liquid crystal display means for displaying an image; and
optical means arranged between said light source and said liquid crystal display means, for slitting light emitted from said light source into two light beams, one of said light beams being transmitted and incident upon said liquid crystal display means, and other light beam being reflected by said reflector in a direction of said light source and the reflected light beam being incident upon said liquid crystal display means.

16. An apparatus according to claim 15, further comprising optical rotary means arranged between said optical means and said light source, for optically rotating the transmitted light beam.

17. A liquid crystal display apparatus, comprising:
a light source;
splitter means for splitting the light emitted from said light source into S-polarized light and P-polarized light;
first liquid crystal display means irradiated with the S-polarized light;
second liquid crystal display means irradiated with the P-polarized light; and means for synthesizing an image displayed on said first liquid crystal display means and an image displayed on said second liquid crystal display means;
said first and second liquid crystal display means each including three liquid crystal display panels for displaying images of three primary colors.

18. A liquid crystal display apparatus, comprising:
a light source;
splitter means for splitting light emitted from said light source into two light beams;
first liquid crystal display means irradiated with one of said two light beams;
second liquid crystal display means irradiated with the other of said two light beams;
means for synthesizing an image displayed on said first liquid crystal display means and an image displayed on said second liquid crystal display means;
a drive circuit board connected to said first and second liquid crystal display means; and
a drive circuit arranged on said drive circuit board, for driving said first and second liquid crystal display means.

19. An apparatus according to claim 18, wherein said splitter means includes means for splitting the light emitted from said light source into S-polarized light and P-polarized light.

20. An apparatus according to claim 18, wherein:
said splitter means includes means for splitting the light emitted from said light source into S-polarized light and P-polarized light; and
said apparatus further comprises optical rotatory means arranged for optically rotating one of the S-polarized light and P-polarized light.

21. A liquid crystal display apparatus, comprising:
a light source;
reduction means for reducing a cross section of a region through which light passes from said light source;
an optical member for converting the light emitted from said reduction means into parallel light;
splitter means for splitting the parallel light into P-polarized light and S-polarized light;
optical rotatory means arranged for optically rotating a polarization direction of one of the P-polarized light and S-polarized light by $\pi/2$ radians; and
synthesizing means for synthesizing the P-polarized light and S-polarized light.

22. A light source apparatus for use in a projection-type liquid crystal display apparatus, comprising:
a light source;
means for splitting light emitted from said light source into P-polarized light and S-polarized light, and for rotating a polarization direction of one of the P-polarized light and S-polarized light so as to coincide with a polarization direction of other polarized light; and
an optical member for synthesizing the P-polarized light and S-polarized light whose polarization directions coincide with each other, and for emitting a beam of parallel light rays.

* * * * *